(12) United States Patent
Jubeck et al.

(10) Patent No.: US 10,345,170 B2
(45) Date of Patent: Jul. 9, 2019

(54) GAUGE DEVICE FOR MEASURING TENSION ON A PULLING ROPE DURING A CABLE PULL

(71) Applicant: Greenlee Textron Inc., Rockford, IL (US)

(72) Inventors: John Michael Jubeck, Towson, MD (US); John Siegfried Tobias, Hoffman Estates, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 2 days.

(21) Appl. No.: 15/641,799

(22) Filed: Jul. 5, 2017

(65) Prior Publication Data

US 2018/0010973 A1 Jan. 11, 2018

Related U.S. Application Data

(60) Provisional application No. 62/358,677, filed on Jul. 6, 2016.

(51) Int. Cl.
*G01L 5/10* (2006.01)
*G01L 1/12* (2006.01)
(Continued)

(52) U.S. Cl.
CPC .............. *G01L 5/108* (2013.01); *G01L 1/125* (2013.01); *G01L 5/047* (2013.01); *G05B 15/02* (2013.01); *G08B 21/182* (2013.01); *H02G 1/08* (2013.01)

(58) Field of Classification Search
CPC ......... G01L 5/108; G01L 5/047; G01L 1/125; G01B 21/182; G01B 15/02; H02G 1/08
See application file for complete search history.

(56) References Cited

U.S. PATENT DOCUMENTS 2,532,504 A * 12/1950 Lapsley .................... H02G 1/08
254/134.3 R
2,743,606 A * 5/1956 Webber ..................... G01L 5/08
116/DIG. 13
(Continued)

FOREIGN PATENT DOCUMENTS

CN 202729498 U 2/2013
JP 10-309011 A 11/1998
WO WO 2014073977 A1 * 5/2014 ............... B66D 3/04

OTHER PUBLICATIONS

CPM 100 Cable Pull Monitor User Guide, DP Winch, http://www.team-twg.com/documents/dp-winch/service-operating-manuals/cpm-100-cable-pull-monitor-user-guide.pdf, 2002, 22 pages.

(Continued)

*Primary Examiner* — David J Bolduc
(74) *Attorney, Agent, or Firm* — Klintworth & Rozenblat IP LLP

(57) ABSTRACT

A gauge device according to some embodiments of the disclosure is configured to measure tension on a pulling rope during a cable pull. The gauge device according to some embodiments of the disclosure includes a frame, a housing carried by the frame, a roller rotatably carried by the housing, a sensor on the frame beneath the housing, and at least one additional roller rotatably attached to the frame. The housing is configured to translate linearly relative to the frame, such that when the housing moves relative to the frame, the housing is configured to engage with the sensor to activate the sensor.

24 Claims, 20 Drawing Sheets

(51) Int. Cl.
*G01L 5/04* (2006.01)
*G05B 15/02* (2006.01)
*G08B 21/18* (2006.01)
*H02G 1/08* (2006.01)

(56) References Cited

U.S. PATENT DOCUMENTS

| | | | | |
|---|---|---|---|---|
| 2,944,747 | A * | 7/1960 | Miller | B65H 59/38 |
| | | | | 226/40 |
| 3,310,981 | A * | 3/1967 | Nixon | G01L 5/08 |
| | | | | 73/862.454 |
| 4,034,963 | A * | 7/1977 | Warman | B66D 1/50 |
| | | | | 254/273 |
| 4,372,535 | A * | 2/1983 | Gibson | B66D 1/50 |
| | | | | 254/134.3 R |
| 4,417,718 | A * | 11/1983 | Niskin | B66D 3/06 |
| | | | | 254/394 |
| 4,492,363 | A * | 1/1985 | Niskin | B66D 3/06 |
| | | | | 254/275 |
| 4,508,251 | A * | 4/1985 | Harada | B65H 51/14 |
| | | | | 226/112 |
| 4,508,317 | A * | 4/1985 | Conti | H02G 1/08 |
| | | | | 174/117 M |
| 4,609,180 | A * | 9/1986 | Fisher | H02G 1/08 |
| | | | | 254/134.3 FT |
| 4,609,181 | A * | 9/1986 | Fisher | H02G 1/08 |
| | | | | 254/134.3 FT |
| 4,728,079 | A * | 3/1988 | Nitta | G02B 6/4463 |
| | | | | 254/134.3 FT |
| 4,914,960 | A * | 4/1990 | Kordahi | G01L 5/10 |
| | | | | 73/862.451 |
| 4,983,145 | A * | 1/1991 | Hirai | F16H 7/1218 |
| | | | | 474/117 |
| 5,000,619 | A * | 3/1991 | Kordahi | G01L 5/10 |
| | | | | 405/158 |
| 5,251,492 | A * | 10/1993 | Nowag | G01L 5/04 |
| | | | | 73/862.391 |
| 5,533,711 | A * | 7/1996 | Pickrell | B65H 51/30 |
| | | | | 242/396.9 |
| 5,833,015 | A * | 11/1998 | Hesse | E21B 7/20 |
| | | | | 175/40 |
| 5,984,273 | A * | 11/1999 | Ray | H02G 1/08 |
| | | | | 254/134.3 R |
| 6,286,245 | B1 * | 9/2001 | Broberg | A01K 91/08 |
| | | | | 254/394 |
| 6,370,753 | B1 * | 4/2002 | Washburn | G02B 6/4463 |
| | | | | 254/134.3 R |
| 6,814,271 | B1 * | 11/2004 | Parmanen | F16H 57/12 |
| | | | | 226/188 |
| 7,814,827 | B2 | 10/2010 | Frenken et al. | |
| 9,576,475 | B2 | 2/2017 | Bardin et al. | |
| 2003/0075711 | A1* | 4/2003 | Cook | B66C 23/48 |
| | | | | 254/134.3 FT |
| 2003/0097885 | A1* | 5/2003 | Kell | G01L 5/101 |
| | | | | 73/862 |
| 2011/0001627 | A1* | 1/2011 | Ruan | B60P 7/0861 |
| | | | | 340/668 |
| 2011/0178731 | A1* | 7/2011 | Munoz Ochovo | G01L 5/102 |
| | | | | 702/43 |
| 2012/0105242 | A1* | 5/2012 | Pereira | B66B 5/12 |
| | | | | 340/668 |
| 2013/0026429 | A1* | 1/2013 | Jordan | H02G 1/08 |
| | | | | 254/134.3 R |
| 2015/0068318 | A1 | 3/2015 | Bardin et al. | |
| 2017/0248481 | A1* | 8/2017 | Bubar | H01H 3/0226 |

OTHER PUBLICATIONS

Instruction Manual "00967 Deluxe Force Guage," Greenlee Textron Inc., 2006, 12 pages.
Running Line Tensiometer HTNS10KEP-D, HTNS20KEP-D Users Guide, HIS Business Mfg. Co., http://www.hizbiz.com/Downloads/tensiometer_users_guide.pdf, 2014, 12 pages.
Running Line Tensiometer Users Guide & Safety Manual, CONDUX International Inc., http://www.condux.com/resources/manuals/running-line-tensiometer-manual-new.pdf, 2005, 20 pages.
Machine Translation of CN 202729498.
Machine Translation of JP 10-309011.
Instruction Manual "UT10 Ultra Tugger Cable Puller and Pulling Packages Serial Codes ANB and BBD," Greenlee Textron Inc., 2014, 116 pages.

* cited by examiner

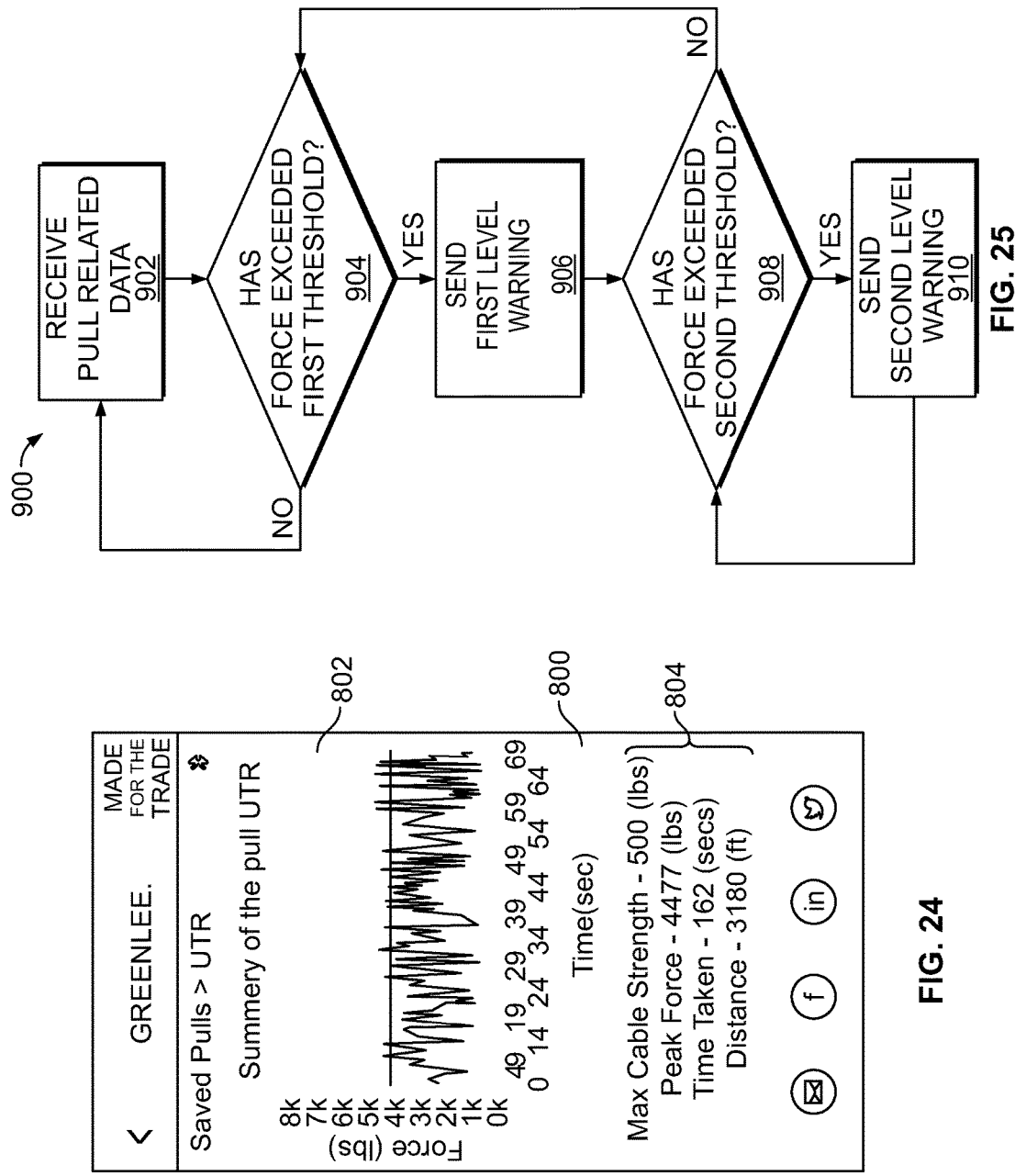

GAUGE DEVICE FOR MEASURING TENSION ON A PULLING ROPE DURING A CABLE PULL

CROSS-REFERENCE TO RELATED APPLICATIONS

This application claims priority to U.S. provisional application Ser. No. 62/358,677, filed on Jul. 6, 2016, the contents of which are incorporated herein in its entirety.

FIELD OF THE DISCLOSURE

The present disclosure relates to a gauge device which is used in association with a cable puller to measure tension force on a pulling rope.

BACKGROUND

Cable pulling is a commonly used technique in building, whereby a pulling rope is attached to a cable or wire that is to be pulled through conduit or along a cable tray by the cable puller. The conduit or cable tray may be any length and may contain any number of bends, turns, or other layout characteristics. The pulling rope is wound by a user around a capstan on the cable puller and tails off the capstan. The capstan is powered by a motor and acts as a frictional force multiplier. The capstan and motor are usually referred to as being part of the puller head of the cable puller. Use of the cable puller to pull the cable or wire through the conduit or along the cable tray allows the user to exert only a small force on the pulling rope that tails off of the capstan. This relatively small force is translated into a large force of several thousand pounds which is exerted on the incoming pulling rope and which provides enough force on the pulling rope and the cable or wire to pull them through the conduit or along the cable tray.

SUMMARY

A gauge device according to some embodiments of the disclosure provides accurate measurement of tension on a pulling rope. The gauge device of some embodiments is configured to provide accurate measurement of tension on a pulling rope without the need for the end user to input the rope diameter. In some embodiments, the gauge device includes a frame, a housing carried by the frame, a roller rotatably carried by the housing, a sensor carried by the frame beneath the housing, and at least one additional roller rotatably attached to the frame. The housing is configured to translate linearly relative to the frame, such that when the housing moves relative to the frame, the housing is configured to engage with the sensor to activate the sensor.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 24 is an example display screen of the application displaying saved data;

FIG. 25 is a flowchart of an example process for monitoring operating conditions of a pull;

DETAILED DESCRIPTION

Figure 1A:
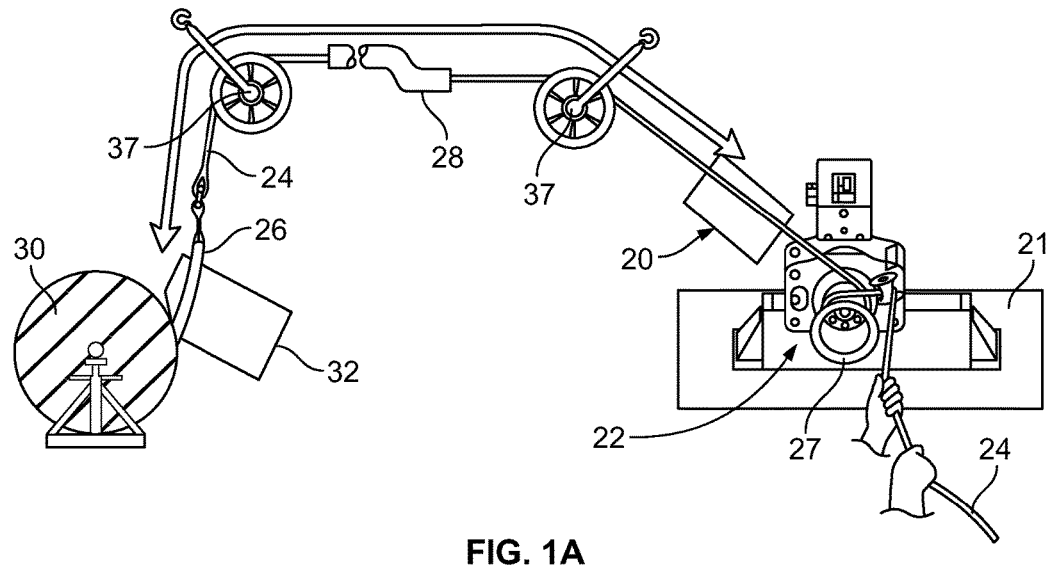
FIG. 1A is a representation of a gauge device shown in an example operating environment.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated. Directional terms, such as upper, lower, top, bottom, vertical and horizontal, are used herein for ease in describing the invention; this does not denote a required orientation during use.

A running line gauge device 20 (often also called a tensiometer or a tension meter) is provided for use with a cable puller 22 in a cable pulling operation. The cable puller 22 is conventional. The cable puller 22 may, for example, be mounted to the floor 21 or may be mounted on a wheeled carriage (not shown). The gauge device 20 of various embodiments provides accurate measurement of tension on a pulling rope 24. The gauge device 20 of some embodiments is configured to provide accurate measurement of tension on a pulling rope 24 without the need for the end user to input the rope diameter. Cable pulling is a commonly used technique whereby the pulling rope 24 is attached to a cable or wire 26 that is to be pulled through conduit 28 or along a cable tray 29 by the cable puller 22. The conduit 28/cable tray 29 may be any length and may contain any number of bends, turns, or other layout characteristics. The pulling rope 24 is wound by a user around a capstan 27 on the cable puller 22 and tails off the capstan 27. The capstan 27 is powered by a motor and acts as a frictional force multiplier. The capstan 27 and motor are usually referred to as being part of the puller head of the cable puller 22. Use of the cable puller 22 to pull the cable or wire 26 through the conduit 28 or along the cable tray 29 thus only requires exertion of a small force on the pulling rope 24 that tails off of the capstan 27. This relatively small force is translated into a large force of several thousand pounds which is exerted on the incoming pulling rope 24 and which provides enough force on the pulling rope 24 and the cable or wire 26 to pull them through the conduit 28 or along the cable tray 29.

The gauge device 20 of various embodiments monitors one or more pull qualities, such as speed, distance travelled, and/or rope tension with respect to time. The gauge device 20 may be configured to alert the user if the tension limit (e.g., a programmed or otherwise specified maximum tension limit) is exceeded. In one example, the alert is provided by a display 180 of the gauge device 20, described in more detail below. Additionally, or alternatively, in some embodiments, the gauge device 20 may be configured to communicate the alert to a computing device via a wireless connection, e.g., for ease of viewing by a user of the gauge device 20, also described in more detail below. Additionally, or alternatively the gauge device 20 may also communicate the monitored information to the computing device via a wired connection, described in more detail below.

Where the gauge device 20 is described herein to communicate alerts, information, data, and/or the like to a remote computing device, it will be appreciated that such alerts, information, data, etc. may be communicated directly to the computing device (e.g., via a wireless communication link that may be established between the gauge device 20 and the remote computing device) and/or indirectly via one or more intermediate computing devices. For example, in some embodiments, the gauge device 20 and one or more remote computing devices may be connected to a structured wireless network having a wireless access point, which may route communications between the gauge device 20 and a remote computing device(s) over the structured wireless network. As another example, in some embodiments, the gauge device 20 may communicate over a wireless connection to a wireless access point and/or other intermediate computing device, which may forward communications from the gauge device 20 to a remote computing device via a wireless connection, wireline connection, and/or some combination thereof.

The gauge device 20 of various embodiments may be compatible with any of a variety of rope sizes. In some example embodiments, the gauge device 20 is compatible with any rope size up to 7⁄8" diameter. In accordance with various example embodiments, the gauge device 20 may be configured to sense the diameter of rope used and does not require the user to input rope type and/or diameter to maintain accurate data. Wire/cable manufactures generally specify both maximum tension limits as well as maximum side wall pressure that the cable can experience without damage. In some embodiments, an application may be provided to enable a user to input parameters, e.g., based at least in part on manufacture specifications, and use the input information along with captured pull information to calculate side wall pressure. In some embodiments, the user may download bend characteristics, e.g., based at least in part on building information modeling (BIM). The application can provide the user with an option to overwrite BIM data if different than the model. When these limits are exceeded, the entire run of cable or wire 26 through the conduit 28 or along the cable tray 29 will need to be emptied and re-pulled. Often, the faulty cable or wire is not discovered until after the construction of the building is complete.

Figure 1B:
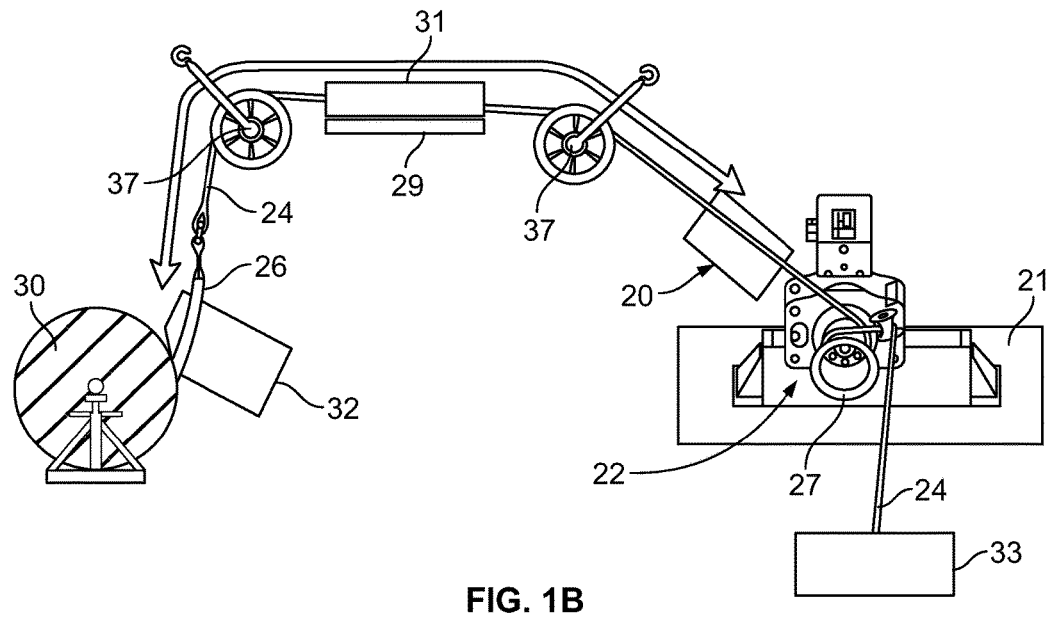
FIG. 1B is a representation of a gauge device shown in an example operating environment.
Figure 2:
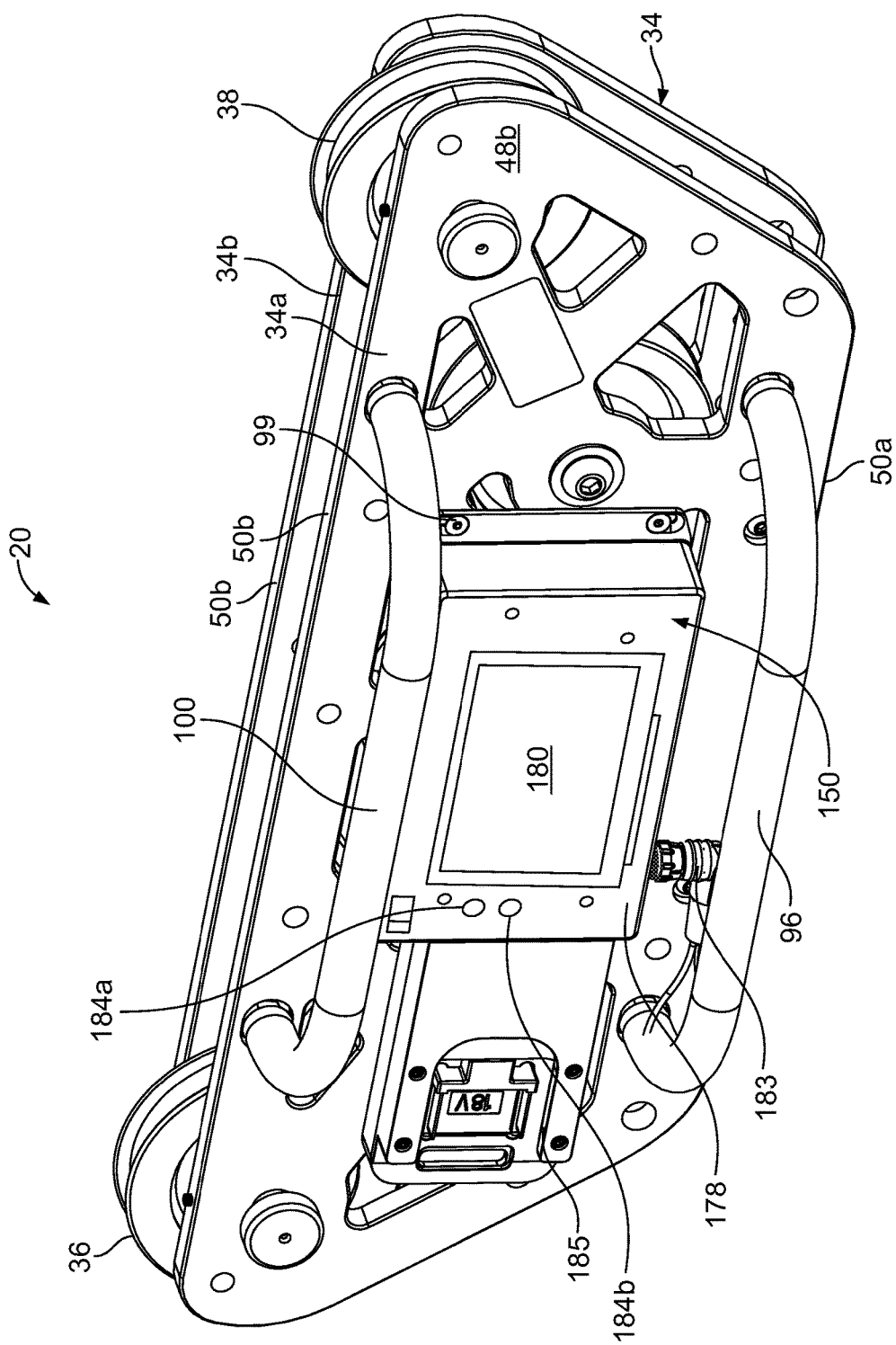
FIG. 2 is a perspective view of the gauge device in accordance with an example embodiment.

FIGS. 1A and 1B illustrate example operating environments for the gauge device 20. In the illustrated operating environment of FIG. 1A, a reel 30 of cable or wire 26 is attached to the pulling rope 24 and fed through conduit 28 by using a conventional cable feeder 32 and the cable puller 22 in a known manner. The cable or wire 26 is fed by the cable feeder 32. The cable puller 22 pulls the pulling rope 24 to pull the cable or wire 26 attached to the pulling rope 24 through conduit 28. Support sheaves or rollers 37 may be provided and to assist in routing the cable or wire 26 between the cable feeder 32 and the cable puller 22. In the illustrated operating environment of FIG. 1B, a reel 30 of cable or wire 26 is attached to the pulling rope 24 and seated into a cable tray 29 by using the cable feeder 32, the cable puller 22 and a cable tray feeder 31 in a known manner. Such a cable tray 29 and cable tray feeder 31 are disclosed in U.S. Ser. No. 14/734,273, the contents of which are incorporated by reference. The cable tray feeder 31 feeds the cable or wire 26 therethrough and can be opened to deposit the cable or wire 26 into the cable tray 29. The cable puller 22 pulls the pulling rope 24 to pull the cable or wire 26 attached to the pulling rope 24. Support sheaves or rollers 37 may be provided and to assist in routing the cable or wire 26 between the cable feeder 32, the cable puller 22 and the cable tray feeder 31. In some embodiments, a rope auto spooler machine 33 is used to spool the pulling rope 24 tailing off the capstan 27 (and in some such embodiments, provides tailing force instead of a user), such a rope auto spooler machine 33 is disclosed in U.S. Ser. No. 15/334,485, the contents of which are incorporated herein by reference. In another embodiment, a combination of conduits 28 and cable trays 29 are provided between the cable feeder 32 and the cable puller 22.

The gauge device 20 of the present disclosure is positioned on the cable puller side of the conduit 28/cable tray 29. The gauge device 20 may be mounted on the cable puller 22, or may be tethered on a stationary object (not shown) between the end of the conduit 28/cable tray 29 and the cable puller 22. As shown by way of example in the drawings, the gauge device 20 is mounted on the cable puller 22, but it is to be understood that this is not required. As the pulling rope 24 and cable or wire 26 are pulled through the conduit 28 or along the cable tray 29, friction between the cable or wire 26 and the conduit 28 or the cable tray 29 increases causing tension in the cable or wire 26. The tension in the cable or wire 26 is the same as the tension in the pulling rope 24. The tension in the pulling rope 24, moving or stationary, as well as the speed and distance, are measured by the gauge device 20.

In some embodiments, the gauge device 20, the cable feeder 32 and/or the cable puller 22 are in communication with each other via any wired or wireless communication interface (not shown). The communication interface can be utilized by the cable feeder 32 to notify the cable puller 22 of a failure or temporary issue with regard to the cable feeder 32 so that the cable puller 22 can stop a pull to prevent damage to the cable or wire 26, the pulling rope 24, and/or any portion of the conduit 28/cable tray 29. Similarly, the communication interface can be utilized by the cable puller 22 to notify the cable feeder 32 of a failure or temporary issue with regard to the cable puller 22 so that the cable feeder 32 can stop feeding the cable or wire 26 and the pulling rope 24 into the conduit 28 or along the cable tray 29. A notification from the cable feeder 32 to the cable puller 22 or from the cable puller 22 to the cable feeder 32 may be triggered manually by an individual operating the cable feeder 32 or the cable puller 22 using a trigger mechanism such as a foot pad, or may be triggered based at least in part upon predefined threshold parameters programmed into the cable feeder 32 and/or the cable puller 22. For example, predefined threshold parameters may be embodied in software and/or firmware components that may be stored in memory of the cable feeder 32 and/or the cable puller 22. In some embodiments, the gauge device 20 communicates with the cable feeder 32 and/or the cable puller 22 to trigger the cable feeder 32 and/or the cable puller 22 to stop if the predetermined tension is exceeded.

Figure 3:
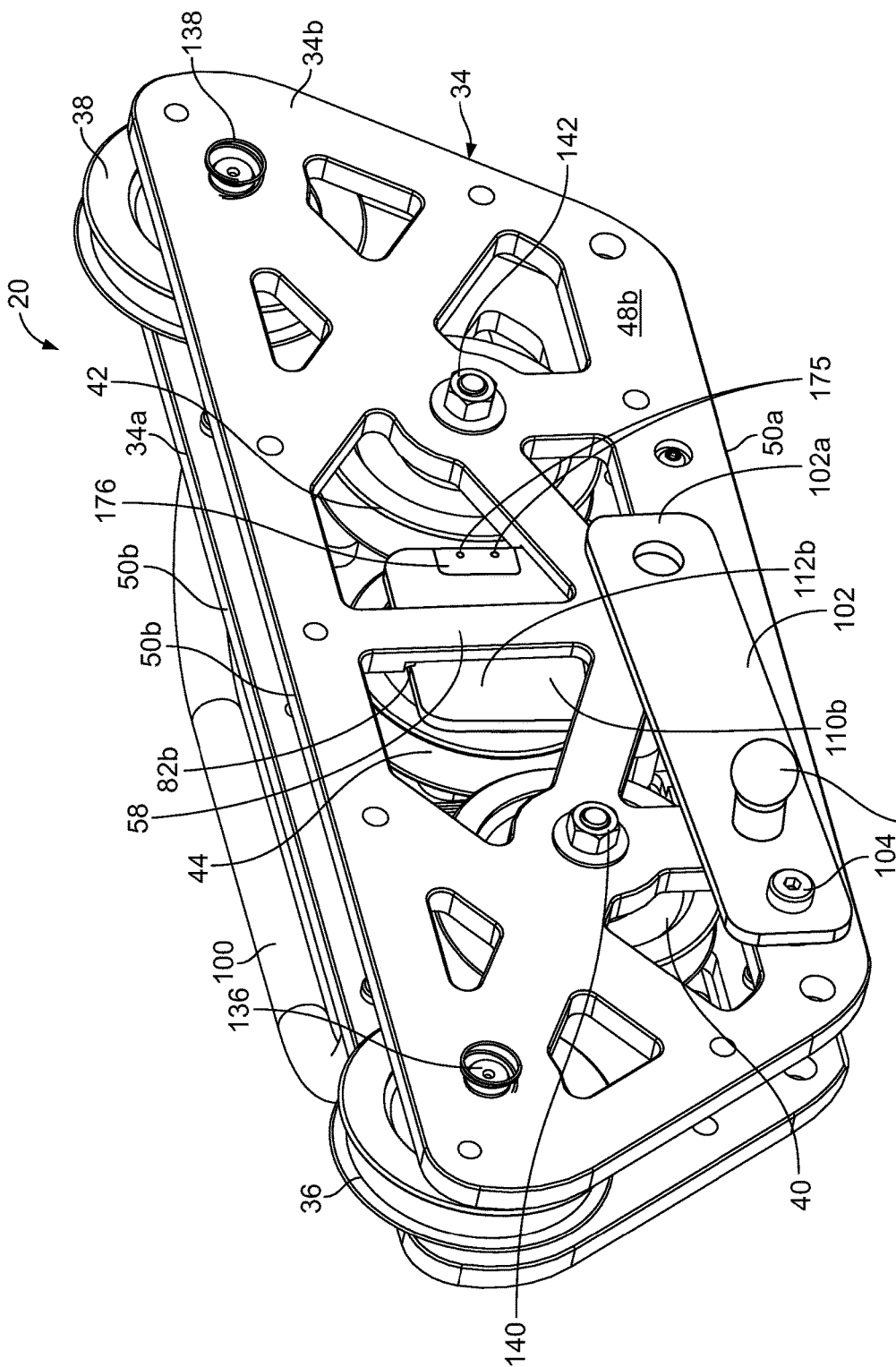
FIG. 3 is an alternate perspective view of the gauge device.
Figure 4:
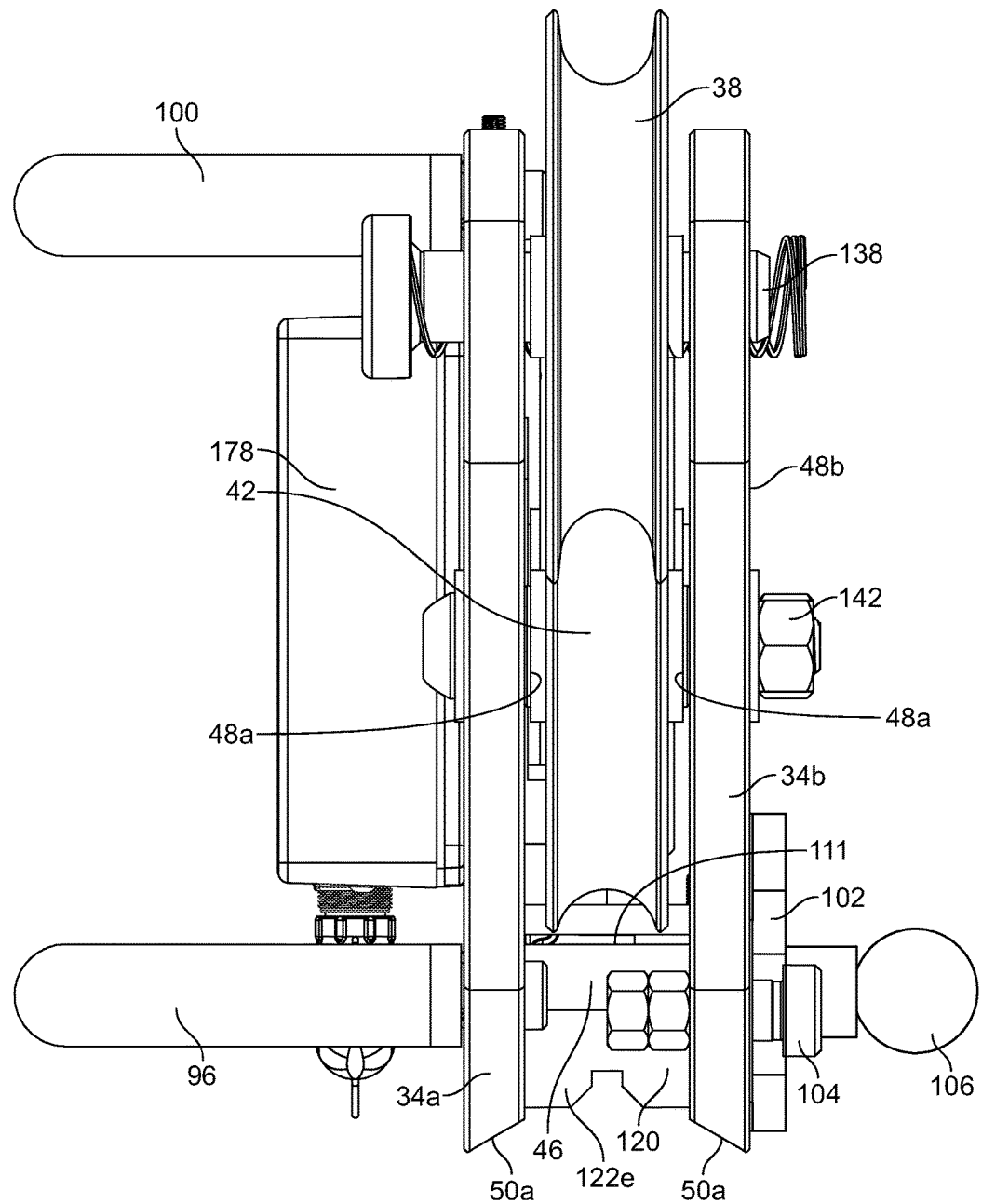
FIG. 4 is an end elevation view of the gauge device.
Figure 5:
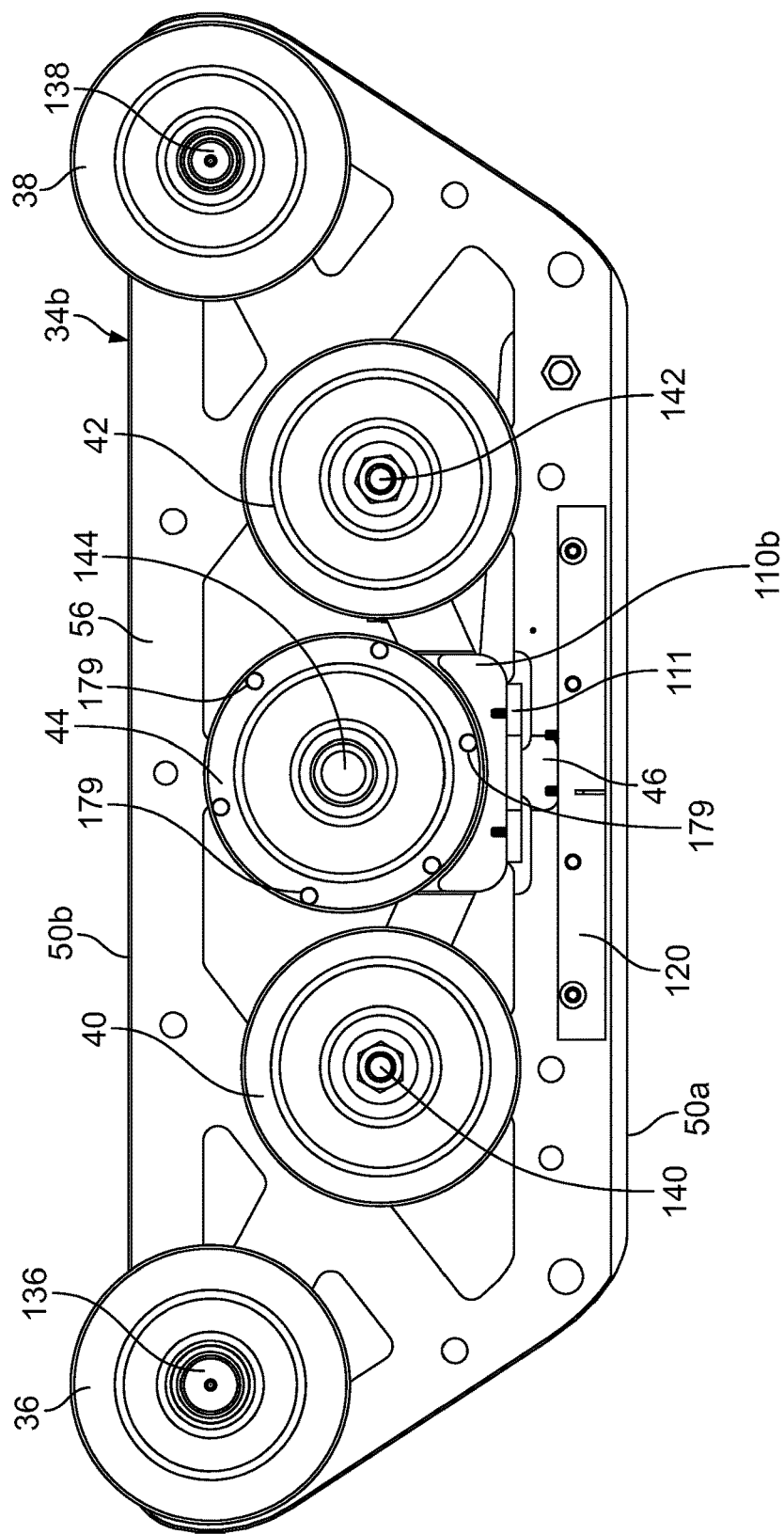
FIG. 5 is a side elevation view of the gauge device, but with a frame part removed so that the internal components can be seen.

Turning now to FIGS. 2-12, the gauge device 20 in accordance with some embodiments is shown. The gauge device 20 includes a frame 34 on which a plurality of rollers is mounted. In some embodiments, the frame 34 includes first and second frame parts 34a, 34b between which the plurality of rollers is mounted. In some example embodiments, five rollers 36, 38, 40, 42, 44, see FIG. 5, are mounted, the fifth one of which forms a central roller 44. The central roller 44 is rotatable and linearly moveable relative to the frame parts 34a, 34b and is capable of activating a sensor 46 mounted between the frame parts 34a, 34b. The central roller 44 is mounted in a housing 108, see FIG. 8, which allows the central roller 44 to move vertically relative to the frame parts 34a, 34b and perpendicular to the rope path. The rollers 36, 38, 40, 42 are rotatable relative to the frame parts 34a, 34b, but are not linearly moveable relative to the frame parts 34a, 34b. It will be appreciated, however, that alternative quantities and arrangements of rollers are contemplated within the scope of the disclosure.

In some embodiments, each frame part 34a, 34b is formed from aluminum, steel, plastic, rubber, carbon composite, other materials, and/or combinations thereof. Each frame part 34a, 34b is identical, except for the differences noted herein. Frame part 34b is described with the understanding that in some embodiments, the other frame part 34a is generally identically formed, except for the differences noted herein.

Figure 6:
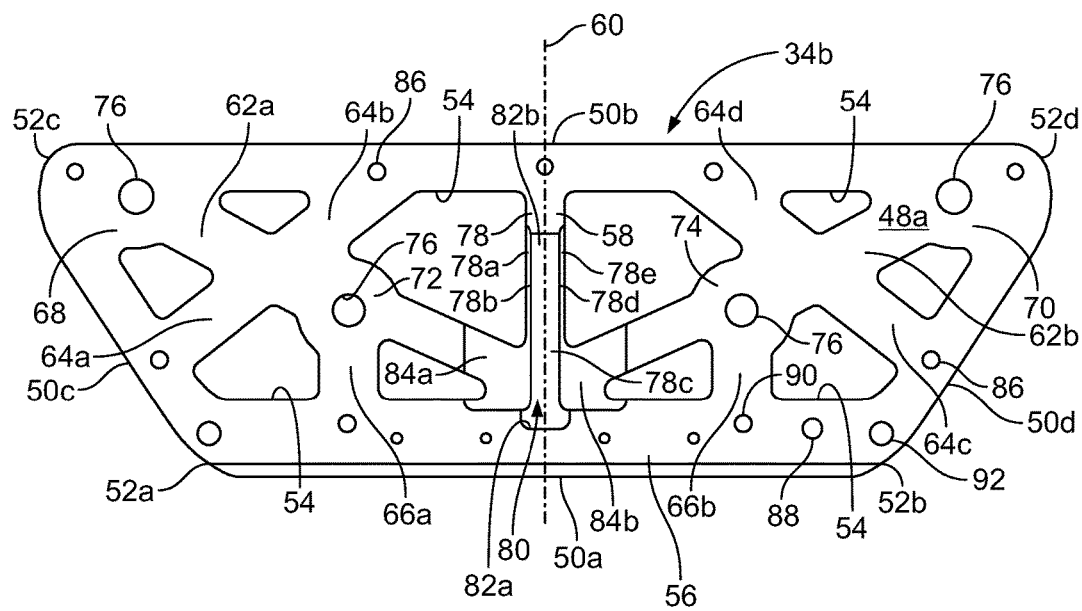
FIG. 6 is a side elevation view of a second frame part.
Figure 12:
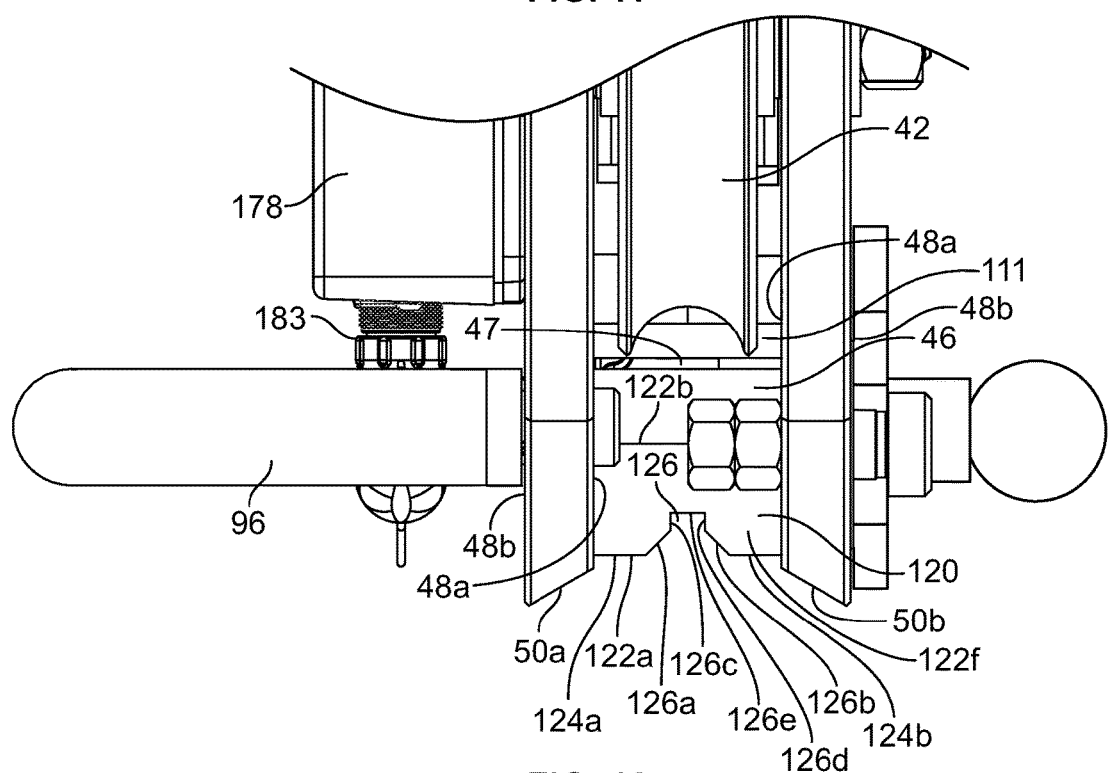
FIG. 12 is a partial end elevation view of the gauge device shown in FIG. 4.

As shown in FIG. 6, the frame part 34b is formed of a flat plate which includes a plurality of cutouts 54 therein in order to reduce the weight of the frame part 34b. As a result, the gauge device 20 of some embodiments has a skeletal frame part design which significantly reduces the weight of gauge device 20 and distributes stress. As shown, the frame part 34b of some example embodiments has inner and outer surfaces 48a, 48b and is formed as a trapezoid. As shown, the frame part 34b has a lower edge 50a, an upper edge 50b which is parallel to the lower edge, a first side edge 50c extending between the lower and upper edges 50a, 50b at a first end of each edge 50a, 50b, and a second side edge 50d extending between the lower and upper edges 50a, 50b at a second end of each edge 50a, 50b. The lower edge 50a is shorter in length than the upper edge 50b. As such, the side edges 50c, 50d extend outwardly from the lower edge 50a and at an angle relative to the lower and upper edges 50a, 50b and relative to each other. As shown in FIG. 12, the lower edge 50a angles or tapers inwardly from the outer surface 48b to the inner surface 48a to form a mating profile for mounting on the cable puller 22 as described herein. A first corner 52a is defined between the lower edge 50a and the first side edge 50c; a second corner 52b is defined between the lower edge 50a and the second side edge 50d; a third corner 52c is defined between the upper edge 50b and the first side edge 50c; a fourth corner is defined between the upper edge 50b and the second side edge 50d. Each corner 52a, 52b, 52c, 52d may be rounded. It will be appreciated that the illustrated and above described trapezoidal shape is provided by way of example, and not by way of limitation. In this regard, it will be readily appreciated that the frame part 34b of various embodiments may take other shapes than a trapezoid. For example, the frame part 34b may be a rectangle with equal length lower and upper edges 50a, 50b and linear side edges 50c, 50d.

The frame part 34b has an outer continuous portion 56 which extends along the edges 50a, 50b, 50c, 50d of the frame part 34b, and a plurality of arms that interconnect with each other. The placement of the cutouts 54 shown in FIG. 6 are shown by way of example, and it will be appreciated that the cutouts 54 may be placed in different locations than that which is shown in FIG. 6. As shown in the specific representation in the drawings, the frame part 34b is symmetrical about a centerline 60 of the frame part 34b and includes 1) a first, vertical, central arm 58 extending between the continuous portion 56 and between the lower and upper edges 50a, 50b and along the centerline 60 of the frame part 34b, 2) a second diagonal arm 62a extending from the continuous portion 56 and from the corner 52c to the centerline 60 of the frame part 34b, 3) a third diagonal arm 62b extending from the continuous portion 56, from the corner 52d to the centerline 60 of the frame part 34b, and which is symmetrical with the second diagonal arm 62a, 4) a fourth diagonal arm 64a extending from the continuous portion 56 and from the midpoint of the first side edge 50c to the second diagonal arm 62a, 5) a fifth diagonal arm 64b extending from the continuous portion 56, from the second diagonal arm 62a to the upper edge 50b, and aligned with the fourth diagonal arm 64a, 6) a sixth diagonal arm 64c extending from the continuous portion 56, from the midpoint of the second side edge 50d to the third diagonal arm 62b, and which is symmetrical with the fourth diagonal arm 64a, 7) a seventh diagonal arm 64d extending from the continuous portion 56, from the third diagonal arm 62b to the upper edge 50b, aligned with the sixth diagonal arm 64c, and which is symmetrical with the fifth diagonal arm 64b, 8) an eighth vertical arm 66a extending from the continuous portion 56, which is offset from, but parallel to, the centerline 60 and which extends between the lower edge 50a and the second diagonal arm 62a, and 9) a ninth vertical arm 66b extending from the continuous portion 56, which is offset from, but parallel to, the centerline 60, which extends between the lower edge 50a and the third diagonal arm 62b, and which is symmetrical with the eighth vertical arm 66a. A first enlarged hub 68 is provided at the intersection of the second diagonal arm 62a and the continuous portion 56. A second enlarged hub 70 is provided at the intersection of the second diagonal arm 62b and the continuous portion 56. A third enlarged hub 72 is provided at the intersection of the second diagonal arm 62a and the eighth arm 66a. A fourth enlarged hub 74 is provided at the intersection of the third diagonal arm 62b and the ninth arm 66b. The first and second hubs 68, 70 are symmetrical; the third and fourth hubs 72, 74 are symmetrical. An aperture 76 is provided through each of the hubs 68, 70, 72, 74. Again, the cutouts 54 may be placed in different locations other than those which are shown such that different arms will be formed.

The central arm 58 of some embodiments has a first surface 78 which is planar with the remainder of the inner surface 48a of the frame part 34b. The first surface 78 extends from the continuous portion 56 at the upper edge 50b and toward the lower edge 50a. The central arm 58 of some such embodiments further has a second surface 78a which is parallel to, but offset from, the first surface 78, a third surface 78b extending perpendicularly from the second surface 78a, a fourth surface 78c extending from the inner end of the third surface 78b and is parallel to the second surface 78a, a fifth surface 78d extending perpendicularly from the fourth surface 78c, and a sixth surface 78e extending from the outer end of the fifth surface 78d and is aligned with the second surface 78a. The third, fourth and fifth surfaces 78b, 78c, 78d form a rail 80 of the central arm 58. The fourth surface 78c is parallel to, but offset from the first surface 78, thereby forming a lower shoulder 82a between the rail 80 and the first surface 78 at the lower end of the central arm 58 and an upper shoulder 82b, see also FIG. 3, between the rail 80 and the first surface 78 at the upper end of the central arm 58.

As shown in FIG. 6, the second diagonal arm 62a of some example embodiments has a recessed portion 84a provided therein at the intersection of the second diagonal arm 62a and the central arm 58. The recessed portion 84a is continuous with and planar with the second surface 78a. The third diagonal arm 62b has a recessed portion 84b provided therein at the intersection of the third diagonal arm 62b and the central arm 58. The recessed portion 84b is continuous with and planar with the sixth surface 78e.

The continuous portion 56 may have a number of apertures 86 therethrough to accommodate mounting the gauge device 20 with some embodiments of cable pullers.

Figure 7:
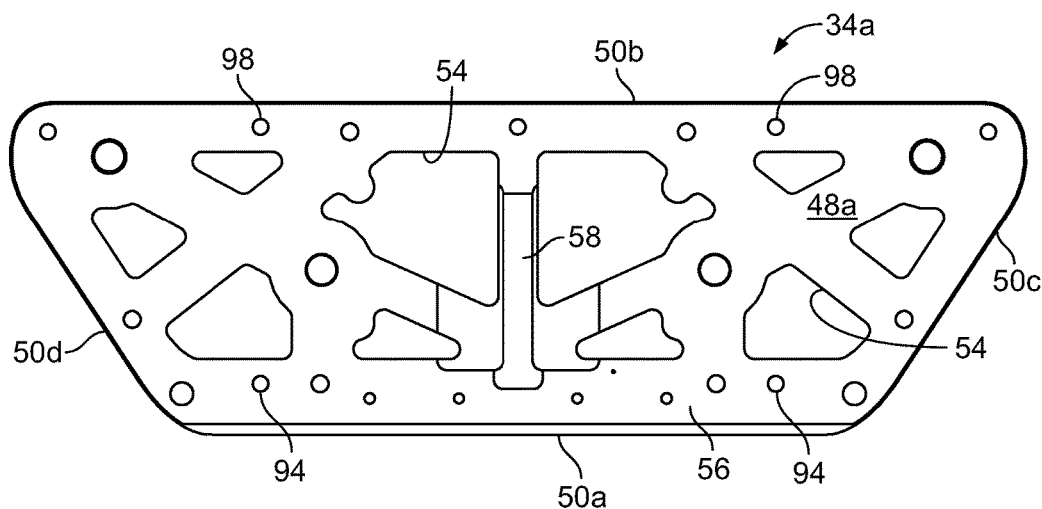
FIG. 7 is a side elevation view of a first frame part.

The difference between the frame parts 34a, 34b in accordance with some embodiments will now be described. As shown in FIG. 6, frame part 34b of some embodiments has a locking bar mounting aperture 88 provided through the continuous portion 56 proximate to the corner 52b. A first pin receiving aperture 90 is provided through the continuous portion 56 and is proximate, but spaced from the locking bar mounting aperture 88. The first pin receiving aperture 90 is between the locking bar mounting aperture 88 and the central arm 58. A second pin receiving aperture 92 is provided through the continuous portion 56 and is proximate, but spaced from the locking bar mounting aperture 88. The second pin receiving aperture 92 is between the locking bar mounting aperture 88 and the corner 52b. As shown in FIG. 7, frame part 34a has a pair of spaced apart apertures 94 to which a lower handle 96 is attached, and frame part 34a has a pair of spaced apart apertures 98 to which a lower handle 100 is attached. The apertures 94 are through the continuous portion 56 and are proximate to the lower edge 50a. The apertures 98 are through the continuous portion 56 and are proximate to the upper edge 50b. Frame part 34a has a computing module 150, which is described in detail herein, mounted in an enclosure 178 mounted thereon by suitable means, such as fasteners 99. The enclosure 178 of some embodiments is mounted on the frame part 34a between the handles 96, 100. The handles 96, 100 extend outwardly from the frame part 34a a further distance than the enclosure 178 extends outwardly from the frame part 34a. In addition to provide for carrying the gauge device 20, the handles 96, 100 of some embodiments serve to protect the enclosure 178 and its electronics therein if the gauge device 20 is dropped. In accordance with some example embodiments, the computing module 150 may be powered by a battery that may be disposed in the gauge device 20. For example, in some such embodiments, a battery 185 is also mounted on the frame part 34a and supplies power to the computing module 150 via wire.

In some embodiments, the gauge device 20 includes a Hall effect sensor. In some such embodiments, Hall effect sensor 176, see FIG. 3, is mounted on the outer surface 112b of the first vertical wall 112 of the housing part 110b by fasteners 175 extending through one or more apertures 177, see FIG. 9, and is used as described herein. In some embodiments, the Hall effect sensor 176 can operate in conjunction with a number of equally spaced magnetic targets 179 to send signals to control circuitry 154, see, e.g., FIG. 14, to calculate and display the speed and distance of the pulling rope 24/cable or wire 26. Additional or alternative to the Hall effect sensor 176, other types of sensors may be used, for example, in some embodiments an optical sensor or various other proximity sensors and their respective targets can be used, including encoders. In some embodiments, distance can be calculated by a separate entity, e.g., on the basis of instantaneous speed and/or average speed over time.

In some embodiments, a locking bar 102, see FIG. 3, is attached by a pivot 104 to the locking bar mounting aperture 88 on frame part 54b. The locking bar 102 of some such embodiments can be fixed into two positions. In a first position, the locking bar 102 is mounted such that an end 102a of the locking bar 102 is proximate to the central arm 58 such that the end 102a overlaps the frame part 34b. In this position, a locking pin 106 is inserted through an aperture in the locking bar 102 and into the first pin receiving aperture 90. In a second position, the locking bar 102 is mounted such that the end 102a is approximately 180 degrees rotated from that shown in FIG. 3, such that the end 102a extends outwardly from the frame part 34b. In this position, locking pin 106 is inserted through the aperture in the locking bar 102 and into the second pin receiving aperture 92. When the locking bar 102 is in the second position, this prevents the pulling rope 24 from being pulled into the puller 22 when used in a chain or floor mount configuration.

The first roller 36 is mounted by a mount 136 through the apertures 76 provided through the first hub 68 on each frame part 34a, 34b. The second roller 38 is mounted by a mount 138 through the apertures 76 provided through the second hub 70 on each frame part 34a, 34b. The third roller 40 is mounted by a mount 140 through the apertures 76 provided through the third hub 72 on each frame part 34a, 34b. The fourth roller 42 is mounted by a mount 142 through the apertures 76 provided through the fourth hub 74 on each frame part 34a, 34b. The rollers 36, 38, 40, 42 are rotatable relative the frame parts 34a, 34b, but are not linearly translatable relative to the frame parts 34a, 34b. The mounts 136, 138 of the first and second rollers 36, 38 are retractable so that the first and second rollers 36, 38 can be removed from the frame parts 34a, 34b to allow the pulling rope 24 to be laid into the gauge device 20 on top of the rollers 40, 44, 42. The mounts 136, 138 of the first and second rollers 36, 38 may be formed of spring loaded fasteners as disclosed in U.S. Pat. No. 7,814,827, the disclosure of which is incorporated herein in its entirety. The mounts 140, 142 of the third and fourth rollers 40, 42 may be formed of fasteners.

Figure 8:
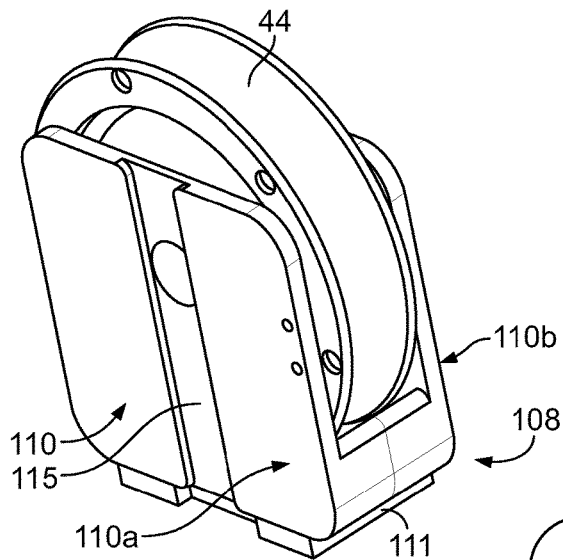
FIG. 8 is a perspective view of a housing and a roller mounted therein.

The central roller 44 of some embodiments is mounted in the housing 108, see FIG. 8, which allows the central roller 44 to move vertically along the rails 80 of the arms 58 and perpendicular to the rope path. The housing 108 includes a first housing part 110a coupled with a second housing part 110b by a lower wall 111. A shaft 118 is fixed to and extends between the parts 110a, 110b. The central roller 44 is seated on the shaft 118 between the first and second parts 110a, 110b and rotates around the shaft 118. Each housing part 110a, 110b is identically formed, so only one housing part 110b is described.

Figure 9:
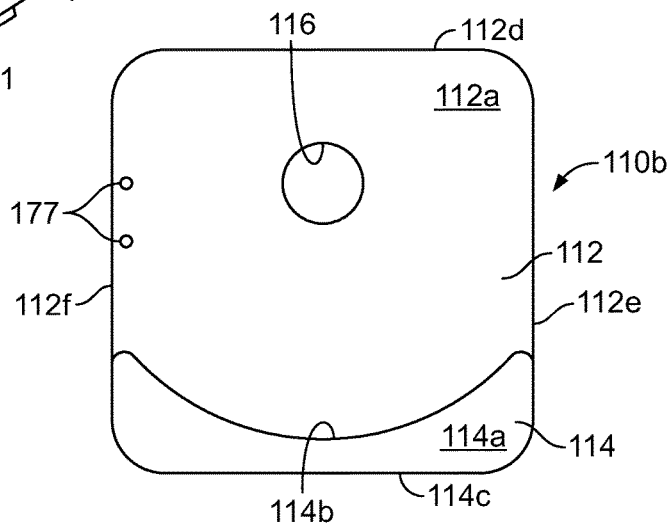
FIG. 9 is a side elevation view of a housing part of the housing of FIG. 8.
Figure 10:
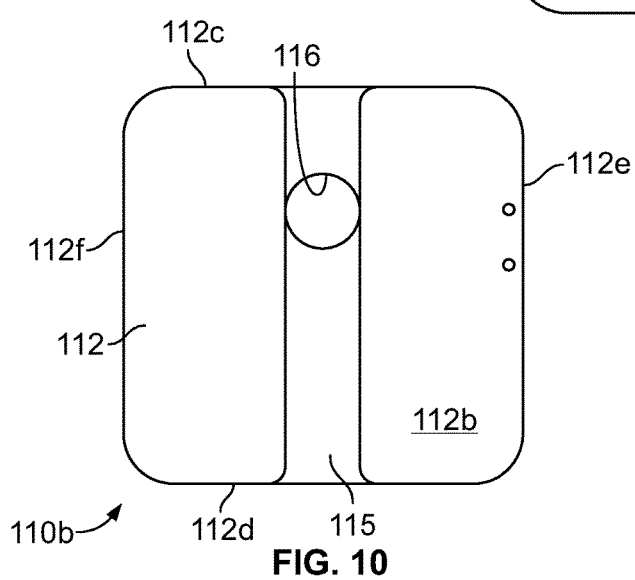
FIG. 10 is an alternate side elevation view of the housing part of FIG. 9.
Figure 11:
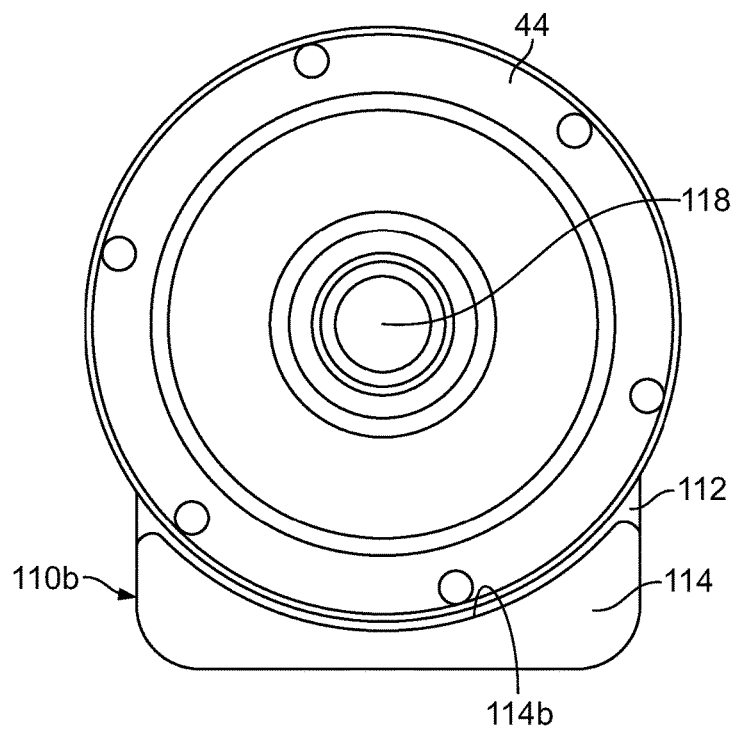
FIG. 11 is a side elevation view of a roller on a housing part.

As shown in FIGS. 9 and 10, the housing part 110b includes a first vertical wall 112 and a second horizontal wall 114 which extends perpendicularly from the first wall 112. The first wall 112 has a planar inner surface 112a and a planar outer surface 112b, such that a lower edge 112c, an upper edge 112d and opposite side edges 112e, 112f extending between the lower and upper edges 112c, 112d are defined. A slot 115 is provided in the outer surface 112b and in an embodiment, extends vertically from the lower edge 112c to the upper edge 112d. The slot 115 mirrors the shape of the rail 80, except that the slot 115 has a height which is less than the height of the rail 80. The second wall 114 has a planar inner surface 114a and extends between the opposite side edges 112e, 112f of the first wall 112. The second wall 114 extends upwardly from the lower edge 112c of the first wall 112 and along a portion of the height of the first wall 112. In some embodiments, an upper surface 114b of the second wall 114 is curved and matches the curvature of the central roller 44. A lower surface 114c of the second wall 114 is planar and aligns with the lower edge 112c of the first wall 112. An aperture 116 is provided through the second wall proximate to, but spaced from, the upper edge 112d of the first wall 112.

The inner surface 114a of the second wall 114 of each housing part 110a, 110b abuts against each other to form a clam shell as shown in FIG. 8. The lower wall 111 is attached, such as by fasteners, to the lower edges 112c and the lower surfaces 114c of the parts 110a, 110b to mate the parts 110a, 110b together. The shaft 118 extends through the apertures 116 and through an aperture through the central roller 44 to sandwich the central roller 44 between the parts 110a, 110b. The outer surface 112b of each housing part 110a, 110b abuts against the inner surface 48a of the respective frame part 34a, 34b. The rails 80 of the frame parts 34a, 34b seat within the slots 114 of the parts 110a, 110b. The rails 80 are longer than the parts 110a, 110b to allow the parts 110a, 110b to move relative to the frame parts 34a, 34b.

A mounting plate 120, see FIGS. 4, 5 and 12, is mounted on the continuous portion 56 proximate to the lower edges 50a of the frame parts 34a, 34b and extends between the frame parts 34a, 34b. The mounting plate 120 has a lower surface 122a, an opposite planar upper surface 122b, side surfaces 122c, 122d extending between the lower and upper surfaces 122a, 122b, and end surfaces 122e, 122f extending between the lower and upper surfaces 122a, 122b. The side surfaces 122c, 122d of the mounting plate 120 abut against the frame parts 34a, 34b and are attached to the inner surfaces 48a of the frame parts 34a, 34b by suitable means, such as fasteners, welding, etc., to mate the frame parts 34a, 34b together. As best shown in FIG. 12, the lower surface 122a has a first portion 124a which is planar and perpendicular to the side surfaces 122c, 122d, a second portion 124b which is planar and perpendicular to the side surfaces 122c, 122d and spaced from the first portion 124a by an elongated slot 126 therein which extends along the length of the mounting plate 120 which is defined between the end surfaces 122e, 122f. The first and second portions 124a, 124b are aligned. The slot 126 is formed from a first angled surface 126a which extends from the first portion 124a, a second angled surface 126b which extends from the second portion 124b, a third vertical surface 126c which extends from the top end of the first angled surface 126a, a fourth vertical surface 126d which extends from the top end of the second angled surface 126b, and a fifth horizontal surface 126e which extends from the upper ends of the third and fourth surfaces 126c, 126d.

The sensor 46, see FIGS. 5 and 12, is mounted on the upper surface 122b of the mounting plate 120 by suitable means, such as fasteners, adhesive, etc. In an embodiment, the sensor 46 is a compression load sensor. In an embodiment, the sensor 46 is a load pin. The use of a compression load cell 46 over a load pin is desirable as load pins are expensive. In an embodiment, the sensor 46 has a depressible button 47 thereon, which when depressed in use, activates the sensor 46. The button 47 of the sensor 46 is in contact with the lower wall 111. The sensor 46 is communicatively coupled with the computing module 150. For example, in some embodiments, the sensor 46 is communicatively coupled with the computing module 150 by a wiring connector 183.

When mounted in the frame parts 34a, 34b, the central roller 44 and its housing 108 are positioned between the third and fourth rollers 40, 42 and positioned closer to the upper edges 50b of the frame parts 34a, 34b than the third and fourth rollers 40, 42 are positioned relative to the upper edges 50b of the frame parts 34a, 34b. The first roller 36 is proximate to the third roller 40, and the second roller 38 is proximate to the fourth roller 42.

Figure 13:
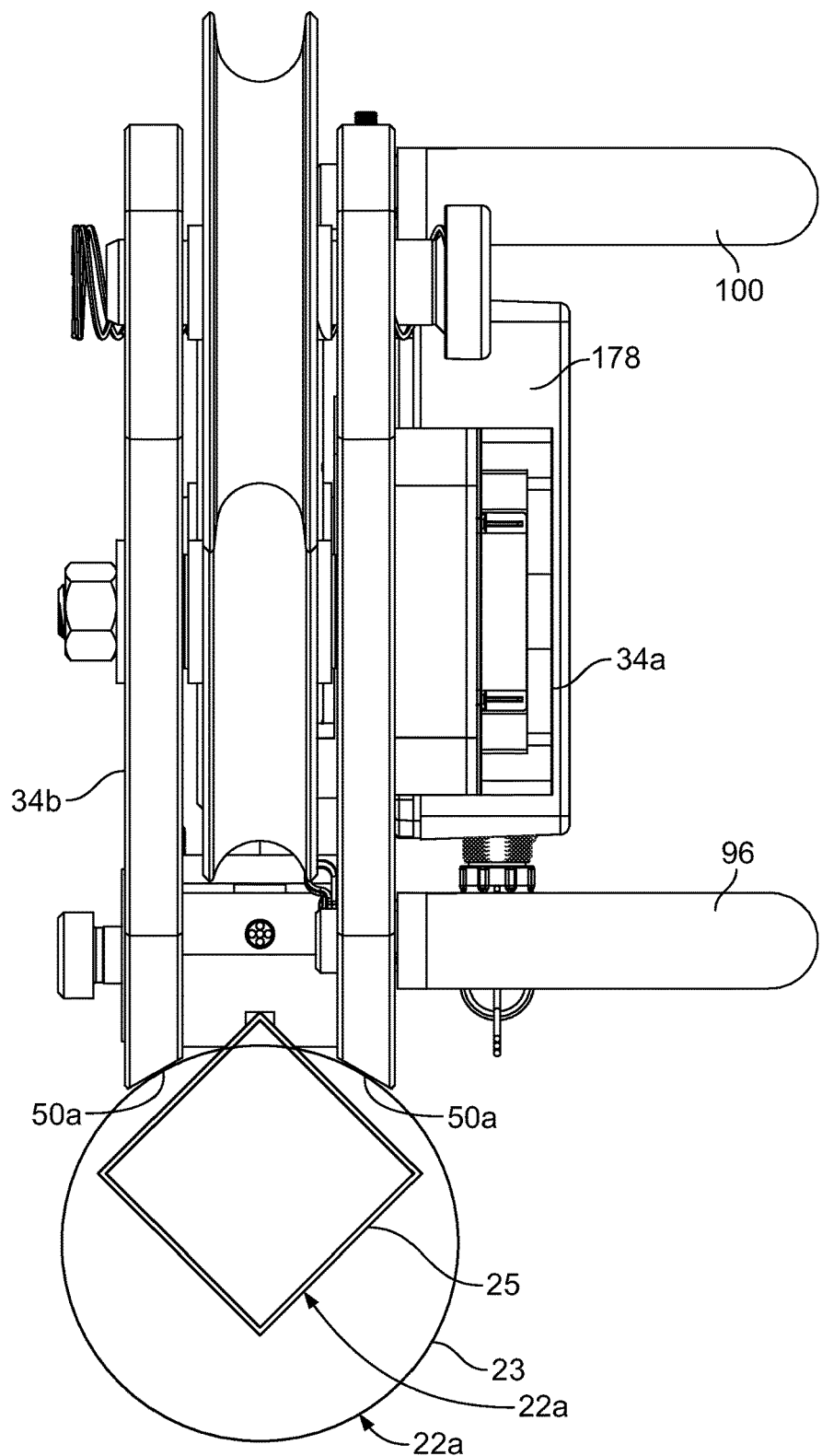
FIG. 13 is an alternate end elevation view of the gauge device, shown on a boom of a cable puller.

In use, the gauge device 20 may be attached to the cable puller 22 as shown, and may be mounted to a boom 22a of the cable puller 22. In use, the gauge device 20 may be mounted to a stationary object on the floor between the conduit 28/cable tray 29 and the cable puller 22. As shown in FIG. 13, the boom 22a may have a circular profile 23 or a rectangular profile 25. The circular profile 23 of the boom 22a engages with the lower edges 50a of the frame parts 34a, 34b to ensure a secure mounting of the gauge device 20 on the boom 22a. The rectangular profile 25 of the boom 22a engages with the first and second angled surfaces 126a 126b of the mounting plate 120 to ensure a secure mounting of the gauge device 20 on the boom 22a or on the stationary object. The corner of the rectangular profile 25 of the boom 22 may also engage with the fifth horizontal surface 126e of the mounting plate 120. The mounting plate 120 of the gauge device 20 has a profile that mates with a variety of cable pullers 22 to assist in properly orienting the gauge device 20 onto the cable puller 22.

In use, the first and second rollers 36, 38 are removed from the frame parts 34a, 34b and the pulling rope 24 is laid across the third, fourth and fifth rollers 40, 42, 44. Thereafter, the first and second rollers 36, 38 are reattached to the frame parts 34a, 34b, thereby trapping the pulling rope 24 between the first and second rollers 36, 38 and the third, fourth and fifth rollers 40, 42, 44. Because five rollers 36, 38, 40, 42, 44 are used in this orientation, any diameter of pulling rope 24 will have the same arc length over the central roller 44. Therefore, the diameter of the pulling rope 24 is not required as a parameter to make the gauge device 20 function.

When the pulling rope 24 is in tension, the pulling rope 24 causes the housing 108 and its central roller 44 to move to activate the sensor 46. When tension increases on the pulling rope 24 as the pulling rope 24 is pulled by the cable puller 22, once a sufficient amount of tension is present in the pulling rope 24, the force is translated to sensor 46 because the housing 108 and its central roller 44 slide along the rails 80 of the frame parts 34a, 34b and depress the button 47 of the sensor 46 which activates the sensor 46. Since the housing 108 can only move linearly relative to the frame parts 34a, 34b, this ensures that all (or at least substantially all) of the load created by the tension in the pulling rope 24 is translated to the sensor 46. The sensor 46 can detect very small loads. This information can be sent to a control circuitry 154, as described below, and used to alert a user as described herein.

The frame parts 34a, 34b, rollers 36, 38, 40, 42, 44 and handles 96, 100 may be formed of aluminum to reduce the weight of the gauge device 20. The handles 96, 100 provide a convenient grasping point for a user to carry the gauge device 20 and to maneuver the gauge device 20, while simultaneously protecting the on-board electronics mounted within the enclosure 178.

Figure 14:
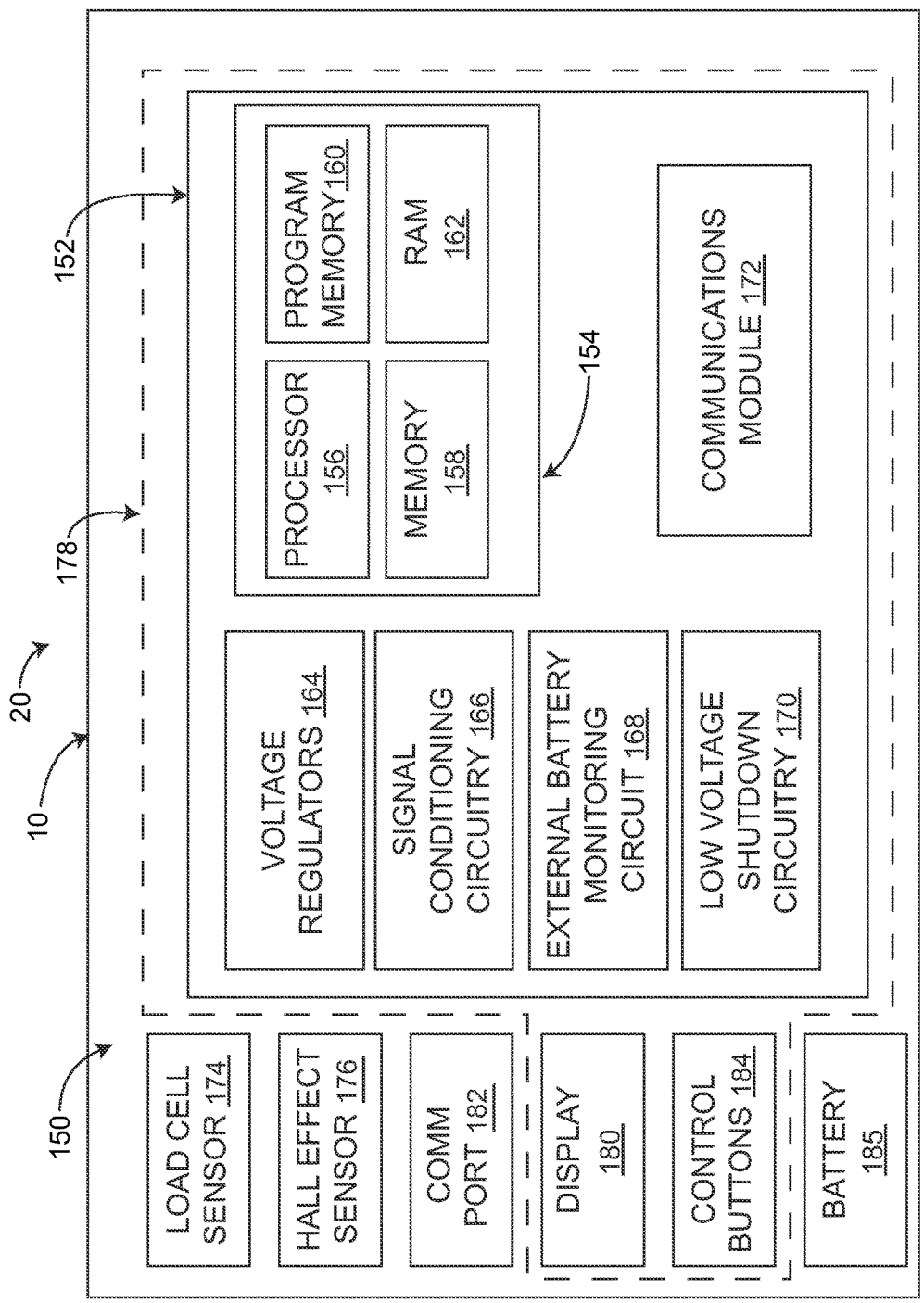
FIG. 14 is a schematic of an example computing module for the gauge device.

FIG. 14 is a schematic of an example computing module 150 for the gauge device 20, and accompanying circuitry. The computing module 150 processes data related to the pulling of a pulling rope 24/cable or wire 26. In some embodiments, the gauge device 20 determines force, distance and/or speed of the pulling rope 24/cable or wire 26 being pulled. Tension caused by force on the pulling rope 24/cable or wire 26 during pulling, if too high, can damage the pulling rope 24/cable or wire 26. Additionally, too much tension on the pulling rope 24/cable or wire 26 can cause other adverse effects including the pulling rope 24/cable or wire 26 snapping or stretching during the pull. As described in more detail below, in some embodiments the computing module 150 determines when to send alerts to the user of any possible damage to the pulling rope 24/cable or wire 26 resulting from excess tension, and the gauge device 20 warns the user before the pulling rope 24/cable or wire 26 fails, for example by snapping or stretching. In some embodiments, the gauge device 20 can also stop the pull, for example, if the gauge device 20 determines that a tension on the rope 24/cable or wire 26 exceeds a threshold. A user can input a maximum force allowed to the computing module 150 for a determined type of pulling rope 24/cable or wire 26 being pulled. In other implementations, the computing module 150 can determine the maximum allowable force from a data structure, such as a lookup table, defining associations between various types of pulling rope 24/cable or wire 26 and respective maximum force thresholds based at least in part on the type of pulling rope 24/cable or wire 26, etc. The lookup table can be stored locally in a memory 158 of the computing module 150 and/or accessed remotely, e.g., over the Internet.

Some of the electrical components can reside on a printed circuit board assembly (PCBA) 152, or other type of electrical component assembly, e.g., an assembly manufactured by a 3D printer process. It will be appreciated that where PCBA 152 is illustrated described herein, it is described by way of non-limiting example, such that alternative assemblies on which circuitry may be embodied may be substituted for PCBA 152 within the scope of the disclosure, including but not limited to application-specific integrated circuit (ASIC), field programmable gate array (FPGA), etc. In some embodiments, a control circuitry 154 is located on the PCBA 152, the control circuitry 154 having a processor 156, a memory 158, a program memory 160 and a random-access memory (RAM) 162, for example, static access memory (SRAM) 162 or other type of memory. The control circuitry 154 processes signals to determine a force, distance and/or speed of the pulling rope 24/cable or wire 26, etc., as described in more detail below. The program memory 160 can be in the form of ferroelectric random-access memory (RAM), NOR flash or one time programmable (OTP) read only memory (ROM), etc. The program memory 160 stores executable instructions, which when executed by the processor 156, causes the processor 156 to perform processes described herein. The computing module 150 of some example embodiments may further include one or more of voltage regulators 164, signal conditioning circuitry 166, an external battery monitoring circuit 168, a low voltage shutdown circuitry 170, and communications module 172. In embodiments including communications module 172, the communications module 172 is configured to enable communication with remote computing devices via one or more wireless communications technologies, such as BLUETOOTH or other wireless personal area network technology (e.g., technology complying with the Institute of Electrical and Electronics Engineers 802.15 standard), Institute of Electrical and Electronics Engineers (IEEE) 802.11 communications, cellular communication technology, and/or other wireless communication technology, as described in more detail below. Additional or fewer components may be included on the PCBA 152.

The control circuitry 154 interfaces with the sensor 46 and the Hall effect sensor 176 of the gauge device 20. The Hall effect sensor 176 can measure the varying magnetic field. The gauge device 20 can include a real-time clock built into the PCBA 152 to obtain time values for performing the distance calculation. By comparing the varying magnetic field strength to the real-time clock, the control circuitry 154 can determine a position and speed of the rope 24/cable or wire 26 monitored by the gauge device 20. Depending on an implementation, other types of sensors that measure force, speed and/or distance can be used. In some example embodiments, the signal conditioning circuitry 166 turns the analog force signal into a digital signal before being received by the control circuitry 154. While the signal conditioning circuitry 166 is illustrated as independent and distinct circuitry separate from the sensor 46 and Hall effect sensor 176, it will be appreciated in some embodiments, the sensor 46, Hall effect sensor 176, and/or other sensors that may be implemented on the gauge device 20 may include an onboard analog-to-digital converter and/or other circuitry that may be configured to convert an analog signal into a digital output such that the sensor(s) may output a digital signal. Accordingly, it will be appreciated that in accordance with various embodiments, signal conditioning circuitry 166 may comprise circuitry interfaced with one or more sensors that is separate and distinct from such sensors, circuitry implemented on one or more sensors, or some combination thereof. Based at least in part upon the geometry of the rollers 36, 38, 40, 42, 44, the processor 156 equates the inputted force signal to ¼th the tension in the pulling rope 24/cable or wire 26. This is dependent on the geometry of the rope path travelling across the centermost three rollers. Alternative geometries may be utilized which transfer different fractions (other than ¼") of the tension in the pulling rope 24. The control circuitry 154 processes the digital signal received from the Hall effect sensor 176 to determine and display a speed of the pulled pulling rope 24/cable or wire 26 and in some embodiments determine a total distance pulled.

The PCBA 152 is housed in the enclosure 178 which protects the components from the environment. An outer surface of the enclosure 178 supports the display 180, e.g., liquid crystal display (LCD), or other type of display. The enclosure 178 may further support a communication port 182, e.g., a universal serial bus (USB) port, a Firewire port, a Thunderbolt port, a Lightning connector port, a serial communications port, a parallel communications port, an Ethernet (RJ-45 connector) port, and/or other communications port that may be used to physically interface gauge device 20 with one or more further communications devices. The enclosure 178 may further support one or more control buttons, such as control buttons 184a, 184b. In some example embodiments, a first control button 184a can provide ON/OFF power functions to the display 180 and a separate control button 184b can provide backlight control. However, it will be appreciated that some embodiments may include additional or alternative buttons having various functionalities, and in some embodiments, one or both of control buttons 184a, 184b may be eliminated entirely. As described in more detail below, the display 180 displays (e.g., in real time) one or more of a force, speed and distance of the pulling rope 24/cable or wire 26 monitored by the gauge device 20, as determined by the control circuitry 154.

The communication port 182 can be accessed for easy file transfer to the gauge device 20 and data retrieval from the gauge device 20. In some embodiments, the control circuitry 154 receives in the field upgraded firmware or software via the communication port 182, and/or outputs data files for saving on a memory stick, computer and/or communication device 402 described below. A USB memory stick does not need to be in place for the control circuitry 154 to store data about the pull. The control circuitry 154 can temporarily store the data in the memory 158 before transferring the data to the USB memory stick. The data includes information about the pull including one or more of a file name, speed, distance and force of the pull, a date of the pull, a time of the pull, user information, and possible other information, including but not limited to a model number and serial number of the puller, etc. Other data can include pull information, e.g., information related to pulling the cable, wire, and/or rope, including but not limited to a maximum strength, peak force during the pull, total time of pull, measured force over time (e.g., a data set including discrete force measurements over a period of time that can be used to plot or graph the measured force over time during a pull), etc.

Figure 15:
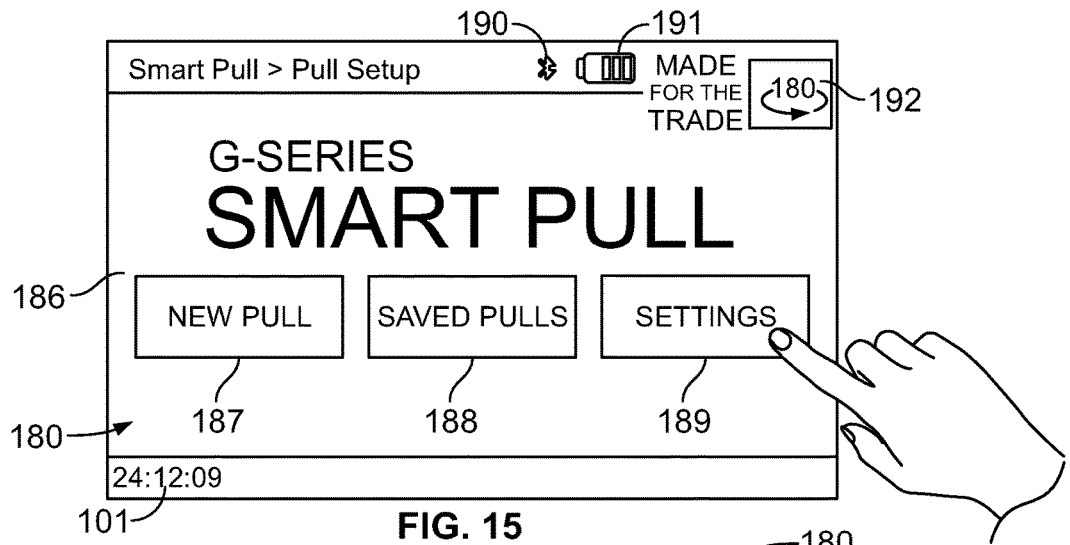
FIG. 15 is a screenshot of an example main menu displayed by the display of the gauge device.

FIG. 15 is a screenshot of an example main menu displayed by the display 180 of the gauge device 20. It will be appreciated that the example of FIG. 15 is provided by way of example, and not by way of limitation and alternative display arrangements of information, selectable menu options, inputs, and the like are contemplated within the scope of the disclosure. The display 180 of some example embodiments comprises a touchscreen display 186 enabling touch interaction with inputs displayed on the display 180. The touchscreen display 186 may, for example, comprise a capacitive touchscreen display. However, it will be appreciated that any suitable touchscreen technology may be used within the scope of the disclosure. In some embodiments, the main menu displays input buttons including a 'new pull' button 187, a 'saved pull' button 188 and a 'settings' button 189. The user can touch the 'new pull' button 187 to begin a new pull or touch the 'saved pull' button 188 to load data to review data on an existing pull. The 'settings' button 189 can be pressed to access factory calibration, set a month/day/time of the gauge device 20, etc. The display 180 may further display the current time 101, e.g., determined by the real-time clock and synchronized via a wireless connection e.g., Wi-Fi or BLUETOOTH, or a wired connection.

In the illustrated example, the display 180 may further display a communication icon, e.g., BLUETOOTH icon 190, a battery icon 191 and an orientation icon 192 which provides operational information to the user at a glance. The BLUETOOTH icon 190 may indicate when a BLUETOOTH enabled device is connected with the gauge device 20. For example, in some embodiments, the BLUETOOTH icon 190 changes color, e.g., to blue, when a BLUETOOTH enabled device is connected with the gauge device 20. Otherwise, the BLUETOOTH icon 190 is red. It will be appreciated that other colors can be used, and the icon 190 may be altered in other manners to indicate whether a device is connected. It will be further appreciated that an alternative icon may be used in addition to or in lieu of BLUETOOTH icon 190 in embodiments in which gauge device 20 is configured to support an additional or alternative wireless and/or wired communication technology to indicate whether the gauge device 20 is wirelessly and/or wired connected to another device or network. Examples of some possible additional wireless and wired technologies are provided herein.

The orientation icon 192 allows the user to change an orientation of the display 180 of the gauge device 20 with a touch, to shift from an up pull to a down pull, or vice versa. The battery icon 191 displays a current charge level of the battery 185 of the gauge device 20, e.g., as monitored by the external battery monitoring circuit 168. The external battery monitoring circuit 168 sends charge information about the battery 185 to the control circuitry 154 which can output the charge information to the display 180 for display, e.g., in 25% or other increments, to represent the current charge level of the battery 185. While powered, the voltage regulators 164 generate a fixed output voltage from the battery 185 to the gauge device 20, independent of the charge level of the batteries and load conditions of the gauge device 20. When the charge level of the battery 185 is below a determined threshold for safe operation of the gauge device 20, the low voltage shutdown circuitry 170 can shut it down.

Figure 16:
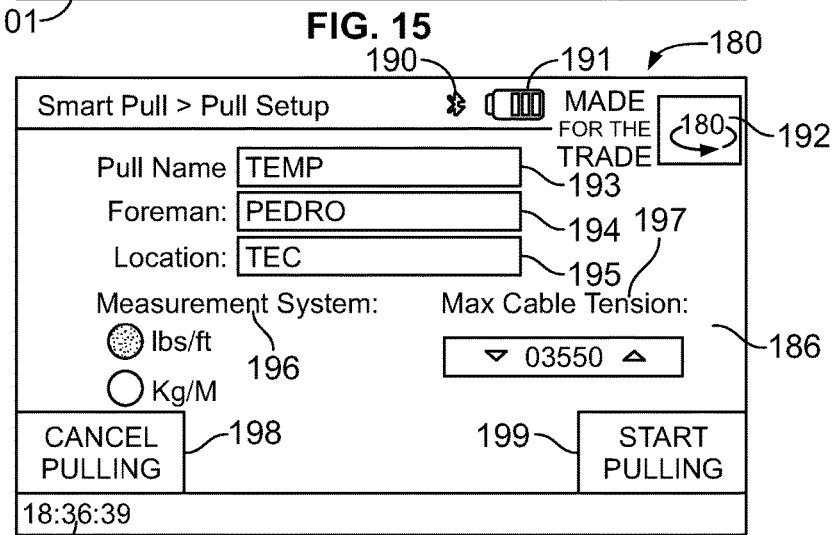
FIG. 16 is a screenshot of an example display of the display during setup for a new pull operation.

FIG. 16 is a screenshot of an example display of the display 180 during setup for a new pull operation. The touchscreen display 186 includes input fields for a user to supply a pull name 193, foreman name 194 and a location 195 of the current pull. When the input field is touched on the touchscreen display 186, the display 180 can display an alphanumeric keypad for the user to enter the field information to an application via the touchscreen display 186. The display 180 can also allow for selection of different measurement systems 196, e.g., lbs/ft or Kg/M, and a maximum cable tension 197 using the touchscreen display 186, e.g., via an application. As described above, startup is simplified since the user need not enter the diameter of the pulling rope 24/cable or wire 26 to accurately determine pulling rope 24/cable or wire 26 tension. The gauge device 20 can also track which ropes have been pulled under how much tension and at what speeds/distances. A 'cancel pulling' icon 198 and a 'start pulling' button 199 are used to cancel or start the pull, respectively.

Figure 17A:
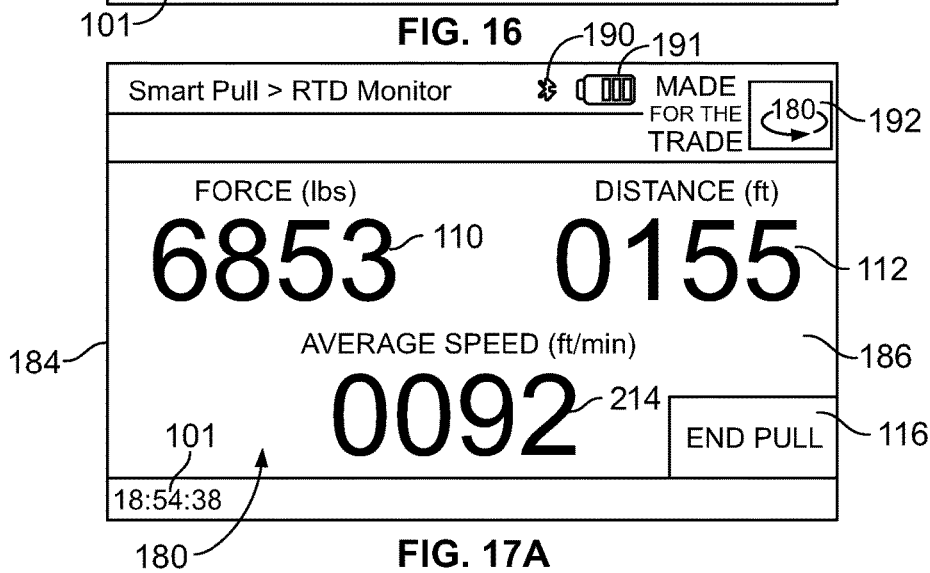
FIGS. 17A-D are screenshots of an example display of the display during a pulling operation.
Figure 17B:
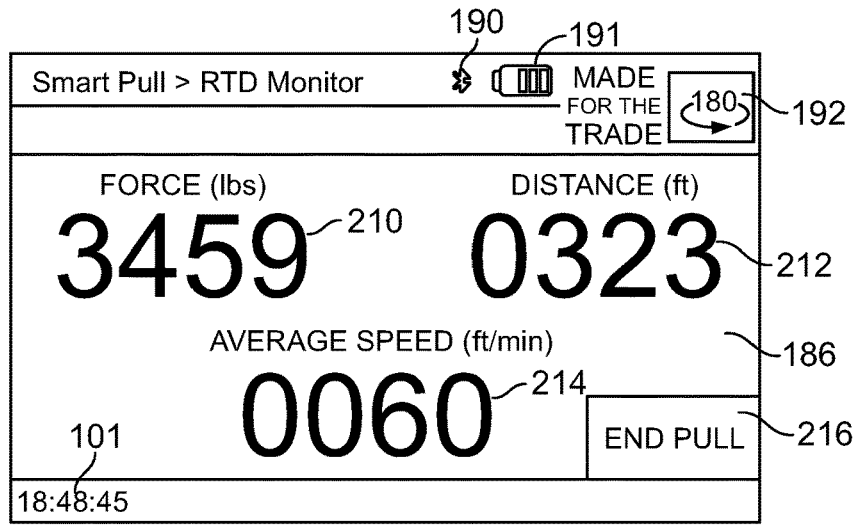
Figure 17C:
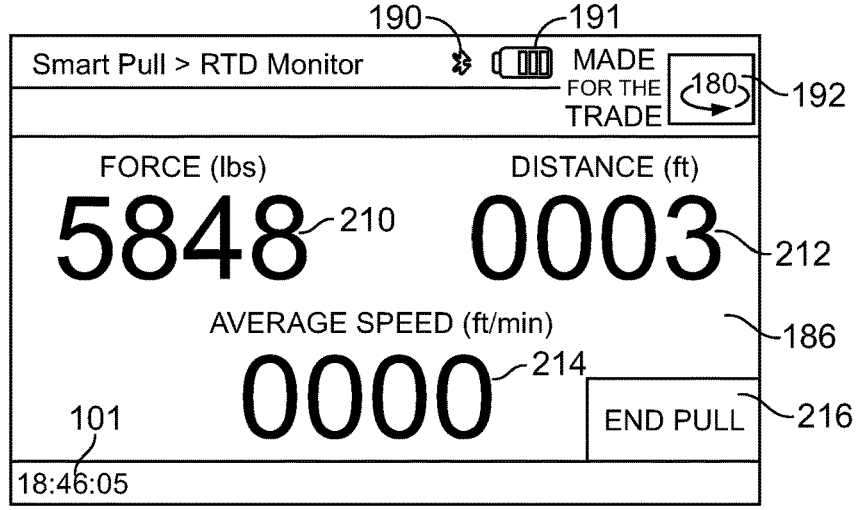
Figure 17D:
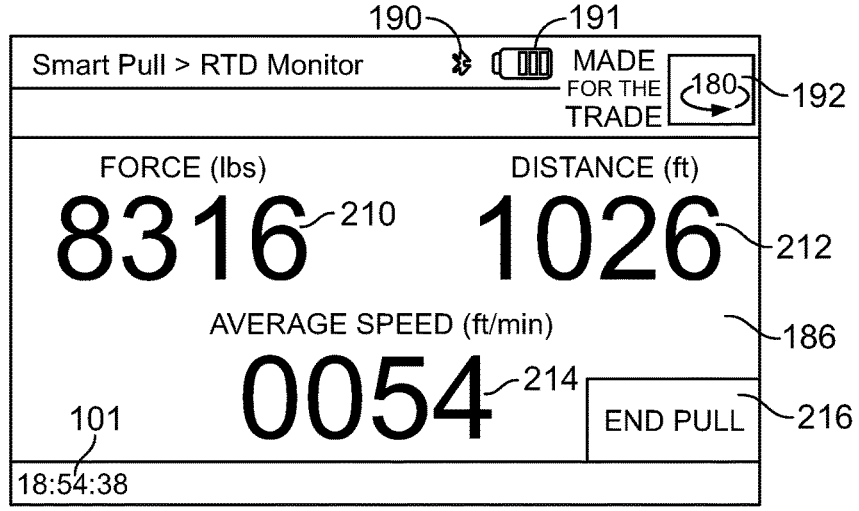

FIGS. 17A-D are screenshots of an example display of the display 180 during a pulling operation. The display 180 displays a current force value 210, distance value 212 and average speed value 214, e.g., as determined by the control circuitry 154 and sent to the display 180 for viewing. The gauge device 20 can display other pull information not limited to duration of pull, etc. An 'end pull' button 216 allows the user to stop recording the data for the pull at any time, for example, at the end of a pull. Additionally, or alternatively, the gauge device 20 can be programmed to automatically stop recording the data for the pull, e.g., when the gauge device 20 detects no pulling for a determined time (e.g., a defined timeout period). When a pull ends, all the data is automatically saved. To provide additional operating condition feedback to the user, in FIG. 17B, a background color of the touchscreen 186 is displayed as a determined color, e.g., white, under normal operating conditions. In FIG. 17C, the background color of the touchscreen is displayed as another determined color, e.g., yellow, to indicate that an operating condition is greater than a determined threshold, e.g., about 80 percent of maximum. Other percentages can be used based on an implementation, e.g., based at least in part on a speed of the changing tension on the pulling rope 24/cable or wire 26. In FIG. 17D, the background color of the touchscreen is displayed as another determined color, e.g., red, to indicate that an operating condition is greater than a determined threshold, e.g., 100 percent of maximum. In some embodiments, the control circuitry 154 determines the background color to be displayed based at least in part on monitoring the pull and comparing the received force signals to the determined thresholds. The control circuitry 154 can flash the background colors on and off to draw further attention to the user. As described in more detail below, wirelessly communication devices 402 may emit tones or vibrate to provide additional or alternative alerts to the user.

Figure 18:
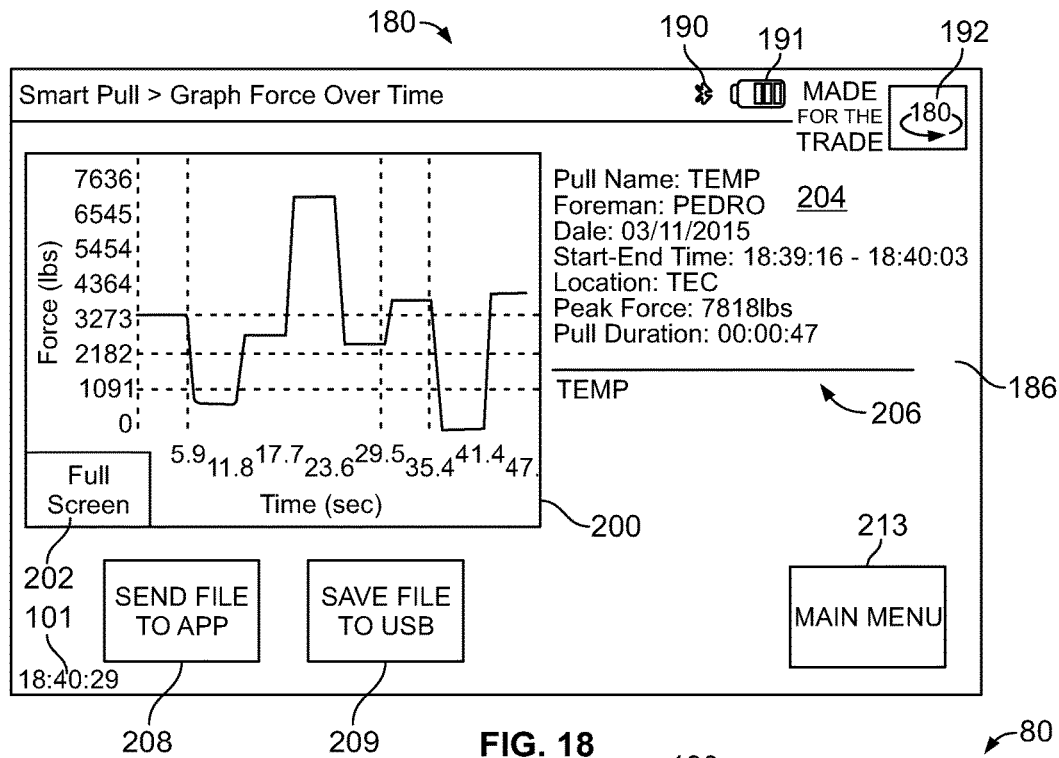
FIG. 18 is a screenshot of an example pull summary data displayed on a screen of the display of the gauge device.

FIG. 18 is a screenshot of an example pull summary data displayed on a screen of the display 180 of the gauge device 20. In one example, the pull summary data can be used to validate and/or certify that there were no damaging forces applied to the pulling rope 24/cable or wire 26 during the pull. The summary data can include a graph 200 illustrating the force over the time of the pull. A 'full screen' button can be touched to expand the graph to cover the full screen area of the display 180. The screen also displays some example pull information 204, e.g., pull name, foreman name, date, start/end time, location, peak force and pull duration of the pull. In accordance with various embodiments, alternative, additional or fewer information can be displayed. A pull-down menu button 206 is pressed to pick the name of the pull to be displayed. A 'send file to app' button 208 and 'save file to USB' button 209 are touched to save a summary of the pull file to a remote device or USB memory stick, respectively. The 'main menu' button 213 is pressed to return the user to the main menu of the display 180.

Figure 19:
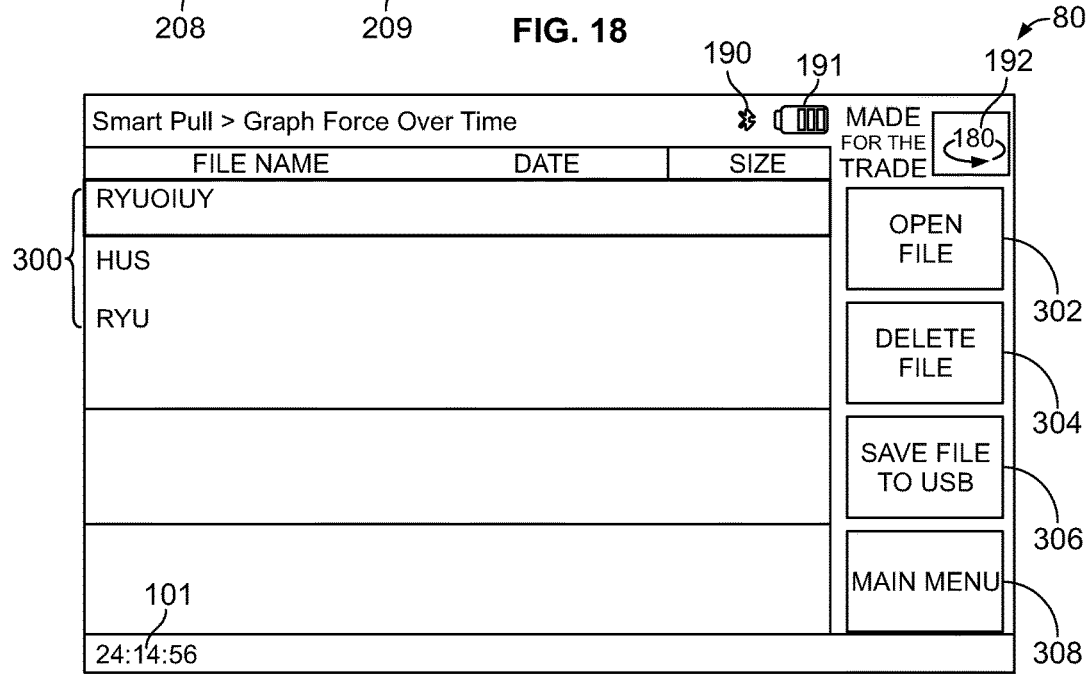
FIG. 19 is a screenshot of an example file management screen of the display the gauge device.

FIG. 19 is a screenshot of an example file management screen of the display 180 of the gauge device 20. The display 180 screen displays a list of saved files 300 containing information about previous pulls. The saved files 300 can be listed by file name, date and size. The touchscreen 186 provides inputs for file management including an 'open file' button 302, a 'delete file' button 304 and a 'save file to USB' button 306. The user can also return to the main menu by touching 'main menu' button 308.

Figure 20:
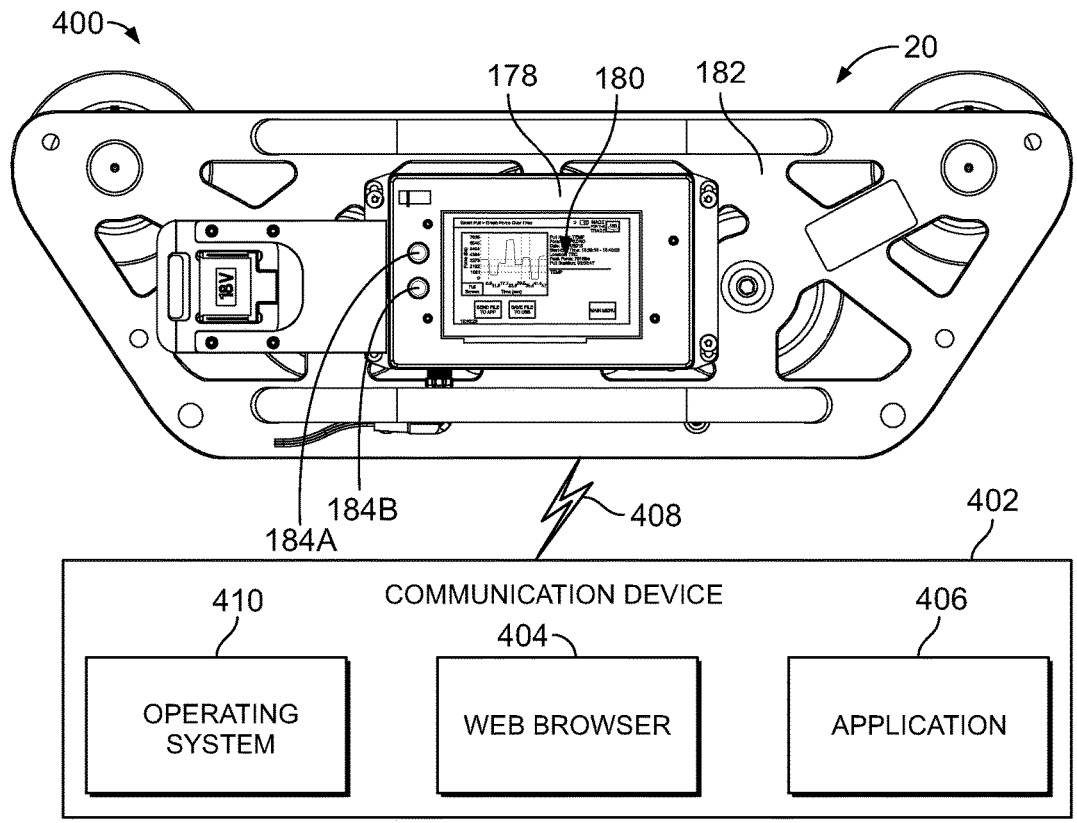
FIG. 20 is a system diagram of an example pulling environment for connecting the gauge device to a communication device which is located remotely from the gauge device.

FIG. 20 is a system diagram of an example pulling environment 400 for connecting the gauge device 20 to a communication device 402 which is located remotely from the gauge device 20. The communication device 402 can include one or more of a mobile device, a smart phone, a personal digital assistant (PDA), a tablet, a laptop computer, a desktop computer, etc. The display 180 of the gauge device 20 may not always be easily accessible by the user. Therefore, the user can access their communication device 402 to obtain information about the pull. The communication device 402 includes one or more of an operating system 410, a web browser 404 and an application 406 to communicatively couple with the gauge device 20. The communication device 402 communicates with the gauge device 20 via a protocol 408 (e.g., BLUETOOTH, 802.11, and/or other suitable wireless communications protocol) to receive and display both live and archived pull related data on the communication device 402. The application 406 can also display when a determined threshold of the pull is approaching or being exceeded. Since alarms on the gauge device 20 may be out of sight or inaudible to the user due to loud construction sites, when a determined threshold is nearing or being exceeded the application 406 application 406 may cause the communication device 402 to produce a perceptible alert to alert a user of the communication device 402. For example, the application 406 may cause the communication device 402 to vibrate, emit audible warnings via a speaker(s) of the communication device 402, and/or display a visual warning (e.g., flashes or other visual alert indication) on a screen of the communication device 402. Thus, for example, if the communication device 402 is in the user's pocket, the user can hear and/or feel that there is an alert and look at the gauge device 20. The communication device 402 can include one or more types of computing devices, including but not limited to, a smart phone, tablet, a laptop, a personal computer (PC), etc., with communication capability and may which may operate on one of a variety of operating systems including but not limited to Microsoft Windows (a registered trademark of Microsoft Corporation), Apple iOS (a registered trademark of Cisco), Apple OSX, Google Android (a registered trademark of Google Inc.), or Linux (a registered trademark owned by Linus Torvalds). The application 406 can be saved directly to the communication device 402 and/or be accessed remotely, e.g., via the web browser 404.

Additional or alternative, to BLUETOOTH, wireless communication includes but is not limited to near field communication (NFC), Wi-Fi, ZigBee, Z-wave, WirelessUSB, WirelessHD, Wireless HART, UWB, Wireless Regional Area Network (WRAN), ISA100a, Radio Frequency Identification (RFID), Infrared (IR), ISM Band, Institute of Electrical and Electronics Engineers (IEEE) 1802.15.4, ANT+, 6LoWPAN, Ultra-Wideband, satellite networks, cellular networks, etc. Additionally, or alternatively, the communication device 402 can connect to the gauge device 20 via a wired technology including but not limited to telephone networks, cable networks, fiber-optic communications, the Ethernet, etc. In one example, the communication device 402 connects with the gauge device 20 via the communication port 182.

Figure 21:
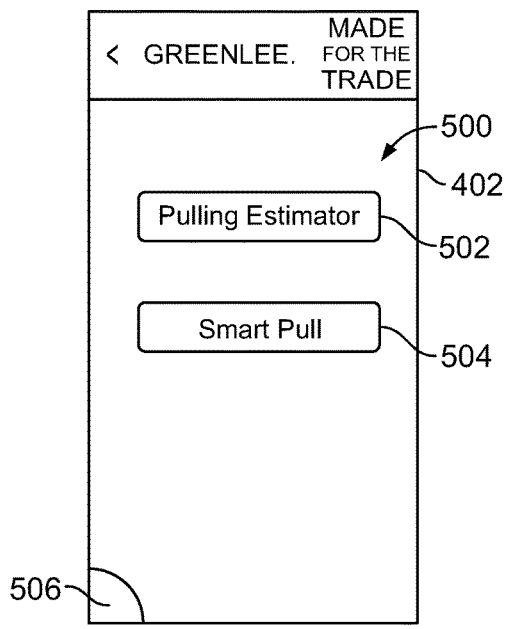
FIG. 21 is a screenshot of an example homepage of the application displaying on the communication device.

FIG. 21 is a screenshot of an example homepage 500 of the application 406 executing on the communication device 402. The pulling environment 400 may make it preferable for the user to monitor pull information on the communication device 402 over the display 180. Alternatively, the user can monitor the data from the display 180 or both the communication device 402 and the display 180, depending on the type of pulling environment 400. The user can access a pulling estimator via the application 406 by engaging the 'pulling estimator' button 502, or start a pull by engaging the 'start pull' button 504. In some embodiments, the pulling estimator is PullCalc available from Greenlee Textron Inc., or other estimator. The user can also access settings of the application 406 by engaging the settings icon 506, for example to change font size, set warning options, pair BLUETOOTH, etc.

Figure 22A:
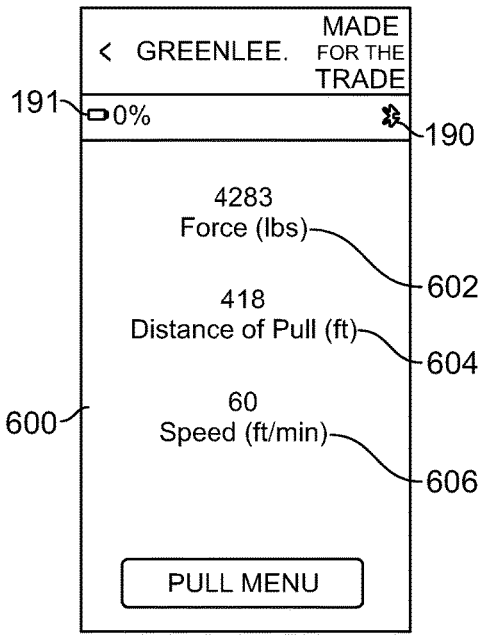
FIGS. 22A-C are screenshots of an example display screen of the application as displayed on the communication device during a pulling operation.
Figure 22B:
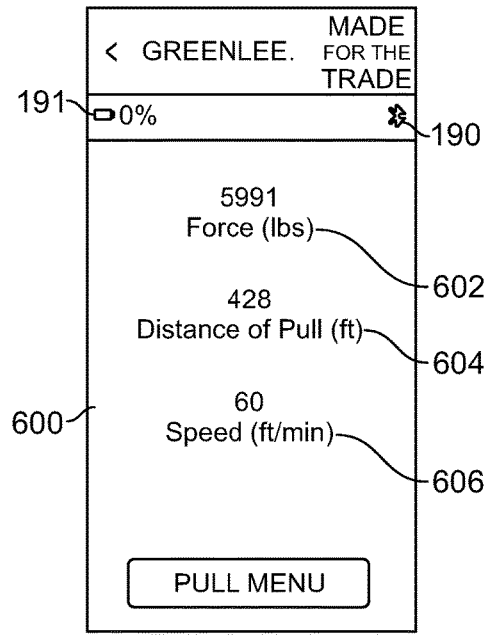
Figure 22C:
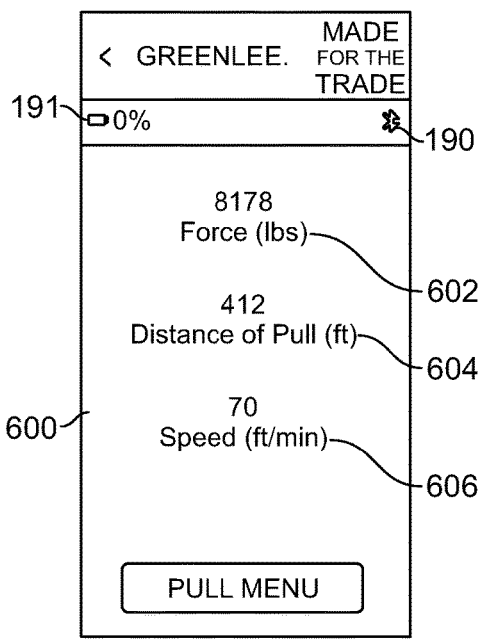

FIGS. 22A-C are screenshots of an example display screen 600 of the application 406 as displayed on the communication device 402 during a pulling operation. The application 406 displays a current force value 602, distance value 604 and average speed value 606, e.g., as sent from the gauge device 20 to the application 406 via the BLUETOOTH connection. The application 406 also displays the BLUETOOTH icon 190 and the battery icon 191 to provide connection and level information about the battery 185 to the user, respectively. When the user inputted tension limit is approached or exceeded and the communication device 402 is connected to the gauge device 20 via BLUETOOTH, the user is notified of the operating condition by the application 406. To provide feedback to the user, in FIG. 22A, a background color of the display screen 600 is displayed as a determined color, e.g., white, under normal operating conditions. In FIG. 22B, the background color of the display screen 600 is displayed as another determined color, e.g., yellow, to indicate that an operating condition is greater than a determined threshold, e.g., about 80 percent of maximum. In FIG. 22C, the background color the display screen 600 is displayed as another determined color, e.g., red, to indicate that an operating condition is greater than a determined second threshold, e.g., about 100 percent of maximum. The colors can flash on/off in the background to draw further attention to the user and provide warnings to the user. The display 180 local to the gauge device 20 can also display the operating conditions as described above.

Figure 23:
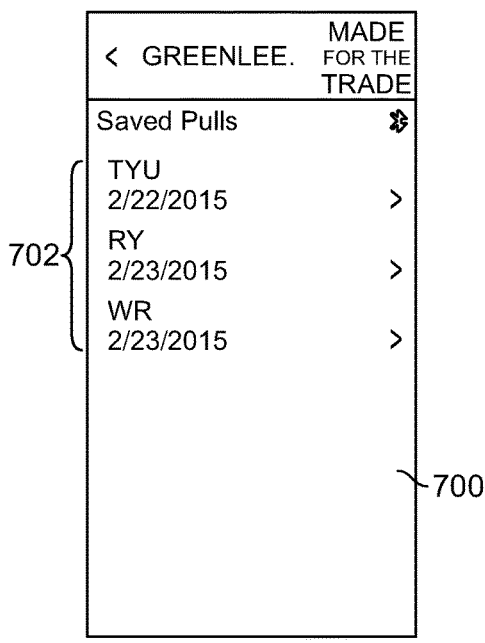
FIG. 23 is an example display screen of the application to display data files transferred from the gauge device to the communication device.

FIG. 23 is an example display screen 700 of the application 406 to display data files 702 transferred from the gauge device 20 to the communication device 402. By opening the data files 702 the communication device 402 can display the data from past pulls.

FIG. 24 is an example display screen 800 of the application 406 displaying saved data. The data can include one or more of a summary of the pull including a graph illustrating the force versus time of the pull in increments of seconds, and other pull information 804 including one or more of a maximum cable strength of the pull, a peak force, a time that it took to complete the pull, a total distance of the pull, etc.

The application 406 can be used to send the data from the communication device 402 via email, and/or to post the data via social media, etc.

FIG. 25 is a flowchart 900 of an example process for monitoring operating conditions of a pull. The computing module 150 receives signals from the sensor 46 and Hall effect sensor 176 representing pull related data, e.g., force and speed, and in some embodiments determines distance (902). The computing module 150 determines whether the tension on the pulling rope 24/cable or wire 26 as determined from the force exceeds a first threshold (904). In some embodiments, the first threshold is about 80 percent of a determined maximum allowable force applied to the pulling rope 24/cable or wire 26, allowing the user to take action before pulling rope 24/cable or wire 26 limits are exceeded. If the force has exceeded the first threshold the computing module 150 sends a first level warning (906). The first level warning can include changing the background color of the display 180 screen, and changing the background color of the application 406 executing on the communication device 402. The application 406 also makes the communication device 402 vibrate. The computing module 150 determines if the force has exceeded a second threshold (908). In some embodiments, the second threshold is about 100 percent of the maximum allowable force applied to the pulling rope 24/cable or wire 26. If the force has exceeded the second threshold the computing module 150 sends a second level warning (910). The second level warning can include changing the background color on the display 180 screen of the gauge device 20, and the changing the background color of the application 406 executing on the communication device 402. The application 406 also makes the communication device 402 vibrate.

Figure 26A:
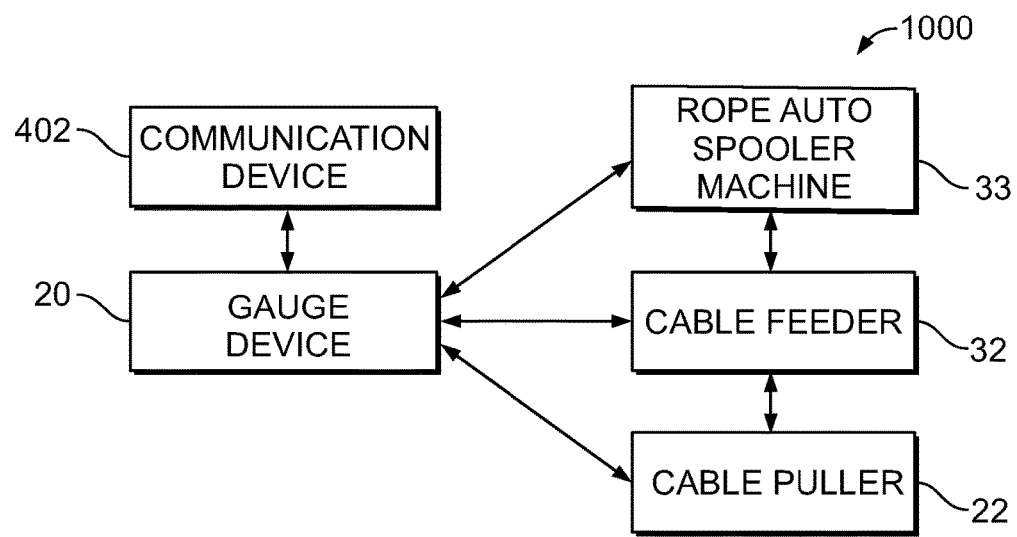
FIGS. 26A-D are block diagrams of example communication connections in the pulling environments.
Figure 26B:
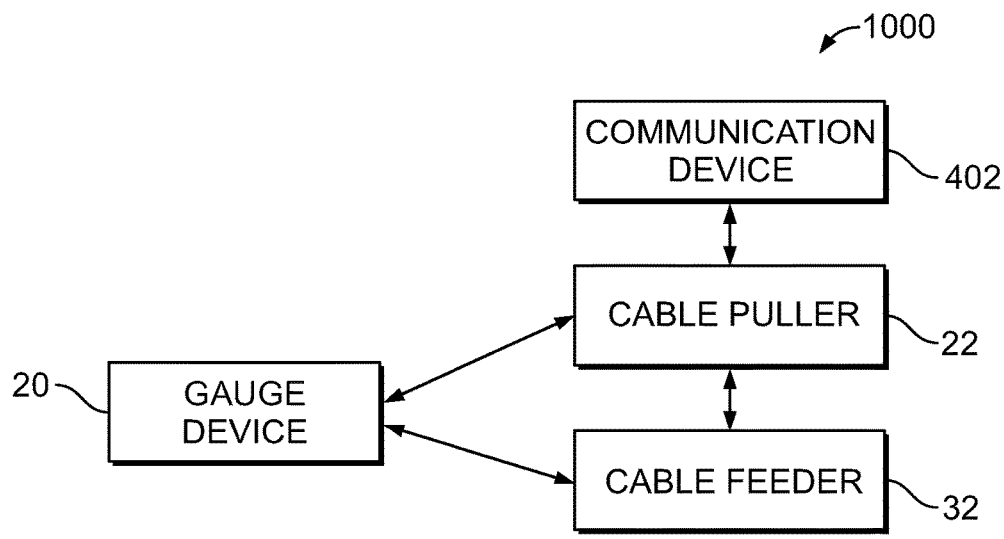
Figure 26C:
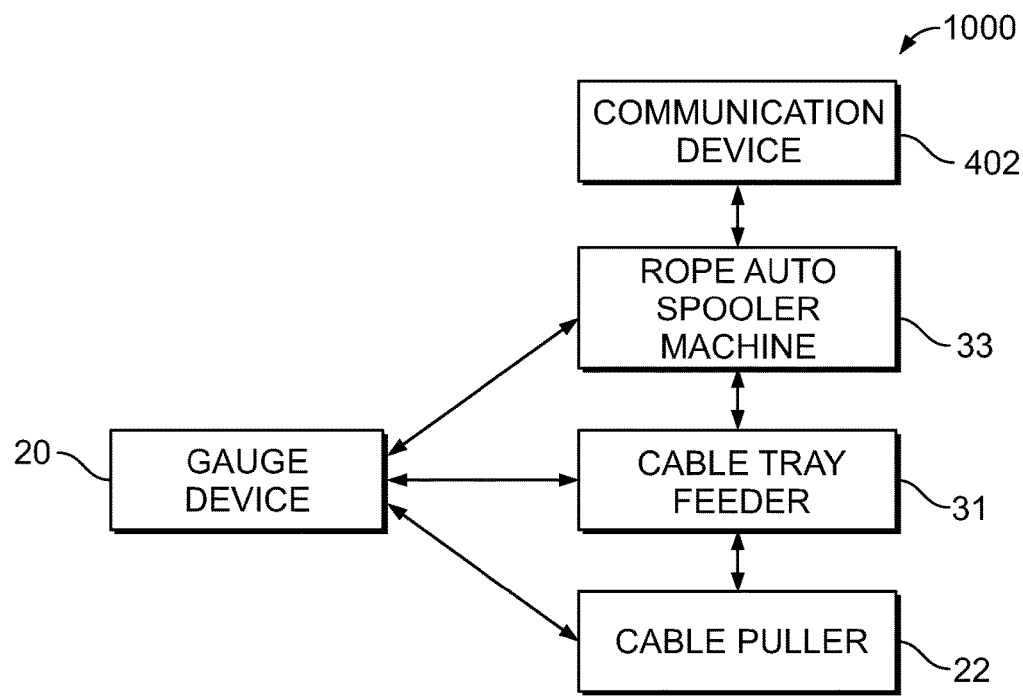
Figure 26D:
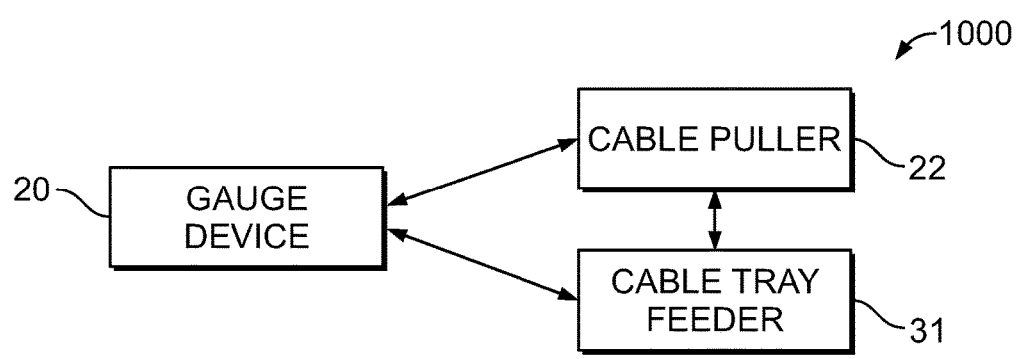

FIGS. 26A-D are block diagrams of example communication connections in the pulling environments 1000. In some embodiments, the pulling environment 1000 can include the gauge device 20, the communication device 402, and a pulling assembly, e.g., the cable puller 22, the cable feeder 32, the rope auto spooler machine 33, and/or other equipment used in a pull, communicatively connected together (FIG. 26A). In some embodiments, the pulling environment 1000 may include just the gauge device 20, the cable puller 22 and the cable feeder 32 (FIG. 26B). In some embodiments, the pulling environment 1000 may include the gauge device 20 and pulling assembly which includes the rope auto spooler machine 33, the cable tray feeder 31 and the cable puller 22 (FIG. 26C). In some embodiments, the pulling environment may include the gauge device 20, the cable puller 22 and the cable tray feeder 31 (FIG. 26C). More or less components/devices can be included than shown in the pulling environments 1000 and may be included in any combination, including various combinations beyond those illustrated by way of example. In some embodiments, the communication device 402 communicatively connects with the cable puller 22 and/or the spooler (e.g., FIGS. 26B and 26C). The communication device 402 may or may not be included in any of the pulling environments 1000 (FIGS. 26A-D).

In some embodiments, the gauge device 20 sends alert messages to a pulling assembly, e.g., one or more of the cable puller 22, cable feeder 32, cable tray feeder 31 and/or a rope auto spooler machine 33. In some embodiments, the messages sent from the gauge device 20 includes, but is not limited to, pull information about speed, distance travelled, and/or rope tension with respect to time as determined/monitored by the gauge device 20. In some embodiments, the messages include one or more of alert message(s) and/or command(s) to stop a pull, start a pull, increase pull speed, decrease pull speed, etc. In some embodiments, the pulling assembly, e.g., cable puller 22, cable feeder 32, cable tray feeder 31 and/or rope auto spooler machine 33, process the received information to determine whether or not to display an alert message, stop the pull, start the pull, increase pull speed, decrease pull speed, and/or otherwise adjust the pulling rate. In some embodiments, the a display 1126 of the cable puller 22, cable feeder 32, cable tray feeder 31 and/or rope auto spooler machine 33 can be used to display alert messages, and/or pull information, e.g., one or more of the information displayed by the gauge device 20 and/or communication device 402, e.g., described above. The display 1126 can display the alert messages and/or pull messages with one or more of audible messages, e.g., via tones and/or words outputted by a speaker, and/or a visual message, e.g., via one or more lights, textual messages displayed on a screen, etc.

In some embodiments, the gauge device 20 communicates the messages wirelessly to the cable puller 22, cable feeder 32, cable tray feeder 31 and/or rope auto spooler machine 33 using wireless communication, such as a personal area network communication protocol, e.g., BLUETOOTH, a local area network communication protocol, e.g., WI-FI, cellular, and/or other wireless communication protocol. It will be appreciated that different communication protocols can be used, such as those described elsewhere herein. In some embodiments, the messages are sent via wired communications. In some embodiments, the gauge device 20 receive information from the cable puller 22, cable feeder 32, cable tray feeder 31 and/or rope auto spooler machine 33 via the communication protocol, e.g., information that the message was received and/or information sensed/determined by the cable puller 22 and/or rope auto spooler machine 33. Messages can be sent/received between the gauge device 20 and the cable puller 22, cable feeder 32, cable tray feeder 31 and/or rope auto spooler machine 33 in response to the occurrence of determined events, e.g., a sensed tension above a threshold, and/or continuously or periodically, e.g., at a determined frequency, e.g., 10 Hz. In some embodiments, if both the cable puller 22 and rope auto spooler machine 33 are included in the pulling environment, one or the other can be designated as a master device, e.g., the rope auto spooler machine 33 can be designated the master.

In some embodiments, the cable puller 22 and/or the rope auto spooler machine 33 process the speed, distance travelled, and/or rope tension information received from the gauge device 20 to determine if any action needs to be taken to control the pull. In some embodiments, the cable puller 22 and/or rope auto spooler machine 33 can send messages and/or instructions to the cable feeder 32 and/or cable tray feeder 31 to control the pull based at least in part on the received and/or determined actions. In some embodiments, the cable puller 22 and/or rope auto spooler machine 33 communicate wirelessly via radio frequency (RF) with the cable feeder 32 and/or cable tray feeder 31. Different communication protocols can be used. In some embodiments, the messages are sent via wired communications, e.g., from the rope auto spooler machine 33 to the cable puller 22. Wireless communication protocols that can be used include, but are not limited to, BLUETOOTH, near field communication (NFC), Wi-Fi, ZigBee, Z-wave, WirelessUSB, WirelessHD, Wireless HART, UWB, Wireless Regional Area Network (WRAN), ISA100a, Radio Frequency Identification (RFID), Infrared (IR), ISM Band, Institute of Electrical and Electronics Engineers (IEEE) 1802.15.4, ANT+, 6LoW-PAN, Ultra-Wideband, satellite networks, cellular networks, etc. Wired technology including but not limited to telephone networks, cable networks, fiber-optic communications, the Ethernet, etc., including, but not limited to, analog signals sent by the rope auto spooler machine 33 to the cable puller 22 to modify operation of a motor, e.g., increase/decrease speed, turn on/off, etc., e.g., by switching relays, flipping switches, etc.

Figures 27, 28:
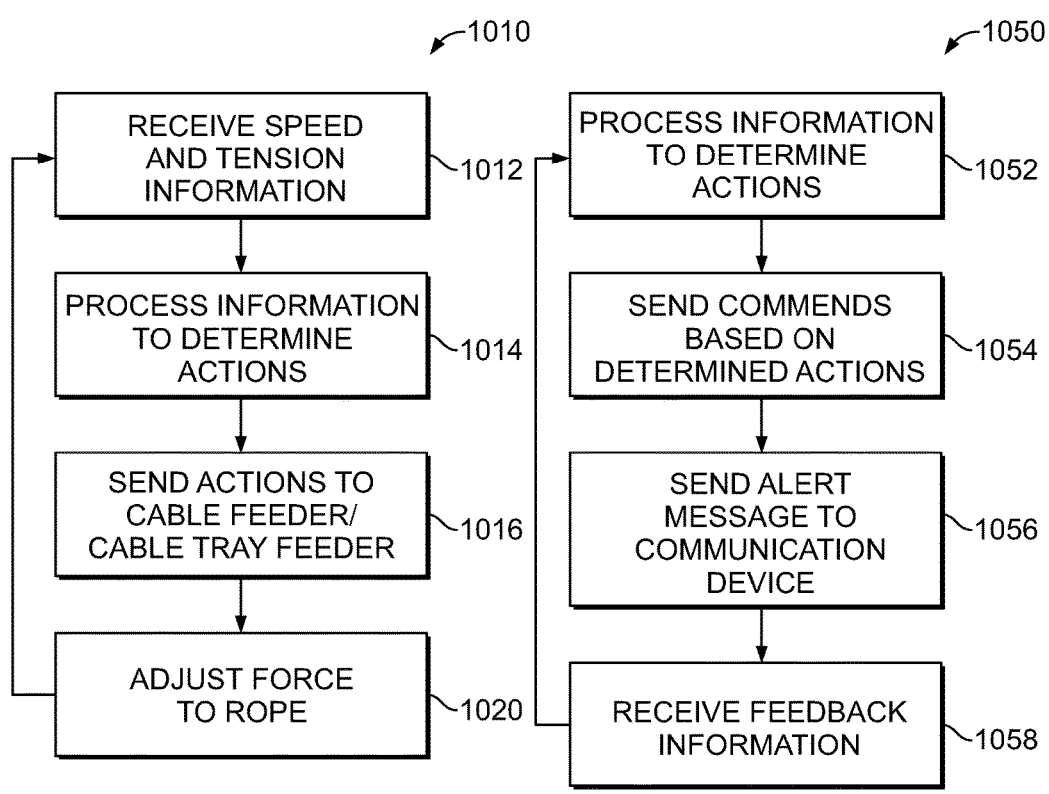
FIG. 27 is a flowchart of an example control logic of the cable puller or rope auto spooler machine.
FIG. 28 is a flowchart of an example control logic of the gauge device.

FIG. 27 is a flowchart 1010 of an example control logic of the cable puller 22 or rope auto spooler machine 33. In some embodiments, the cable puller 22 and/or rope auto spooler machine 33 receives messages with pull information and/or commands from the gauge device 20 (1012). In some embodiments, the messages can include speed and tension information related to the rope 24/cable or wire 26 in the operating environment, e.g., as sensed and/or determined by the gauge device 20. In some embodiments, the cable puller 22 and/or rope auto spooler machine 33 process the information received in the messages, along with tension and speed information sensed by the cable puller 22 and/or rope auto spooler machine 33. In some embodiments, the cable puller 22 and/or the rope auto spooler machine 33 the processed information to determine tailing force tension and/or provide enough tailing force tension to prevent the rope 24/cable or wire 26 from slipping on the capstan 27. In some embodiments, the gauge device 20 measured speed and tension on the rope 24/cable or wire 26 is positioned between the cable puller 22 and the cable tray feeder 31 or cable feeder 32, and the cable puller 22 or the rope auto spooler machine 33 measured speed and tension on the rope 24/cable or wire 26 is positioned between the rope auto spooler machine 33 and the cable puller 22.

In some embodiments, if the cable puller 22 and/or rope auto spooler machine 33 determine from the received and/or directly measured speed and tension information that there is an increase in load on the rope 24/cable or wire 26 and a drop-in tension. Based at least in part on the determination, the cable puller 22 and/or rope auto spooler machine 33 can decide that the rope 24/cable or wire 26 is slipping on the capstan 27. Additionally, or alternatively, in some embodiments, the cable puller 22 and/or rope auto spooler machine 33 act on commands in the messages received from the gauge device 20, e.g., to cause an alert message to be displayed, stop or adjust pulling of the rope 24/cable or wire 26, etc. In some embodiments, in response to determining that the rope 24/cable or wire 26 is slipping, the rope auto spooler machine 33 or cable puller 22 send commands to the cable tray feeder 31 or cable feeder 32 to stop or adjust the pull (1016). In some embodiments, cable tray feeder 31 or cable feeder 32 receive the commands and perform actions based at least in part on the commands, e.g., causing an alert message to display, by stopping the pull, starting the pull, increasing speed, and/or decreasing speed, etc., as determined from the commands (1020). The rope auto spooler machine 33 and/or the cable puller 22 can send the commands to try to maintain enough tailing force on the rope 24/cable or wire 26 to avoid the rope 24/cable or wire 26 from slipping on the capstan 27. In some embodiments, the gauge device 20 continually monitors speed and tension, etc., and sends speed and tension related messages at a determined rate to the cable puller 22 and/or rope auto spooler machine 33 for the cable puller 22 and/or rope auto spooler machine 33 to process and adjust pulling as needed, e.g., to prevent an overload in the pulling environment 1000. In some embodiments, the information can also be sent to the communication device 402 for remote monitoring and/or controlling, e.g., as discussed above.

FIG. 28 is a flowchart 1050 of an example control logic of the gauge device 20. In some embodiments, the gauge device 20 can process speed and tension information to determine actions to take in the pulling environment 1000. The speed and tension information can include information sensed/determined by the gauge device 20 and/or tension information sensed/determined by the cable puller 22 and/or rope auto spooler machine 33 (1052). In some embodiments, the gauge device 20 sends control commands to the cable puller 22, cable feeder 32, cable tray feeder 31 and/or rope auto spooler machine 33 to control pull of the rope 24/cable or wire 26 based at least in part on the determined control commands (1054). The commands can include one or more of cause an alert message to display, stop pulling, start pulling, increase pull speed, decrease pull speed, etc. In some embodiments, the gauge device 20 displays an alert message and/or sends alert messages to the communication device 402 (1056), e.g., as described above. In some embodiments, the gauge device 20 can receive feedback information from the cable puller 22, cable feeder 32, cable tray feeder 31 and/or rope auto spooler machine 33, or other devices in the pulling environment 1000, e.g., to track tension and/or speed information related to the rope 24/cable or wire 26 near those devices (1058).

Figure 29:
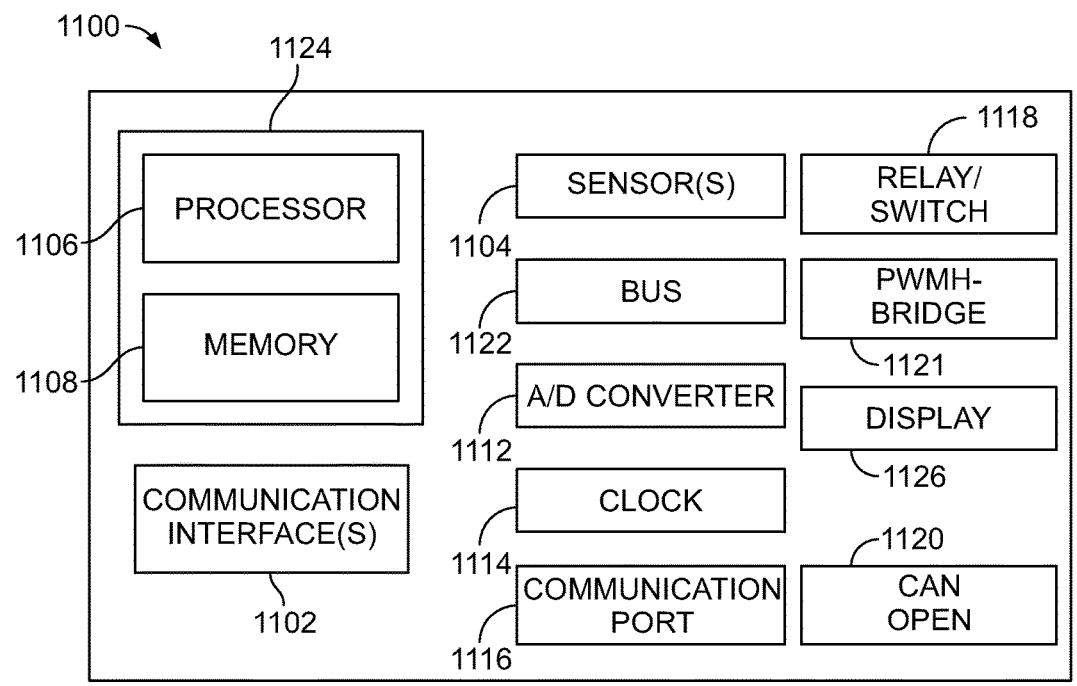
FIG. 29 is a block diagram of an example processing system of the cable puller and the rope auto spooler machine.

FIG. 29 is a block diagram of an example computing module 1100 of the cable puller 22 and/or rope auto spooler machine 33. The computing module 1100 can include a processor 1106 and a memory 1108, e.g., a non-transitory computer medium including any of the memory types described herein. In some embodiments, the processor 1106 can execute instructions stored in the memory 1108 to determine whether an action is needed, e.g., stop the pull, start the pull, increase pull speed, decrease pull speed, etc. In some embodiments, the cable puller 22, cable tray feeder 31, cable feeder 32 and/or rope auto spooler machine 33 receives tension and speed information from the gauge device 20 via the communication interface(s) (1102), e.g., BLUETOOTH, other radio frequency interfaces, other wireless interfaces, wired interfaces, etc. In some embodiments, the cable puller 22 and/or rope auto spooler machine 33 also measure local tension and/or force, speed, etc. via sensor(s) 1104, e.g., a load cell, proximity sensor, etc. In some embodiments, the processor 1106 determines what actions, if any, to perform/command to be performed based at least in part on the received tension and speed information from the gauge device 20 and/or the locally sensed tension of the pull. The actions can help avoid too high a tension caused by force on the pulling rope 24/cable or wire 26 during pulling, to avoid damage the pulling rope 24/cable or wire 26. Additionally, too much tension on the pulling rope 24/cable or wire 26 can cause other adverse effects including the pulling rope 24/cable or wire 26 snapping or stretching during the pull.

In some embodiments, the computing module 1100 can include additional or alternative components, including but not limited to, an A/D converter 1112, e.g., for converting signals from the sensor(s) 1104 and a clock 1114, e.g., for setting a tempo of the processor 1106. In some embodiments, the computing module 1100 includes a communication port 1116, e.g., to be accessed for downloading data from the cable puller 22 and/or rope auto spooler machine 33 and uploading instructions, e.g., via firmware updates. The communication port 1116 can include one or more of a USB port, a Firewire port, a Thunderbolt port, a Lightning connector port, a serial communications port, a parallel communications port, an Ethernet (RJ-45 connector) port, and/or other type of communication port. In some embodiments, the computing module 1100 includes relays/switches 1118, pulse width modulation (PWM) H-bridge 1121 and/or controller area network (CAN) open for controlling/sending operating signals to the motors of the cable puller 22 and/or rope auto spooler machine 33. In some embodiments, the computing module 1100 includes a bus 1122 for connecting the sensors(s) 1104, memory 1108, processor 1106, etc. In some embodiments, the processor 1106 can be embodied as a microprocessor, a coprocessor, a controller or various other computing or processing devices including integrated circuits such as, for example, an ASIC, an FPGA, some combination thereof, or the like, etc.

Figure 30:
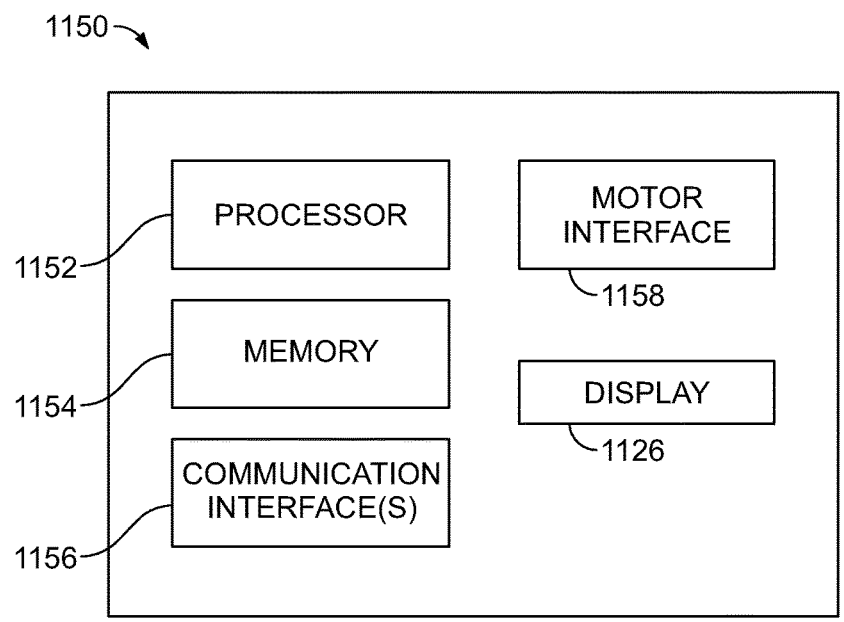
FIG. 30 is a block diagram of an example processing system of the cable feeder and/or cable tray feeder.

FIG. 30 is a block diagram of an example computing module 1150 of the cable feeder 32 and/or cable tray feeder 31. The computing module 1150 can include a processor 1152 and a memory 1154, e.g., a non-transitory computer medium including any of the memory types described herein. In some embodiments, the processor 1150 receives commands from the cable puller 22 and/or the rope auto spooler machine 33 to control pulling, e.g., to cause an alert message to display, stop the pull, start the pull, increase pull speed, decrease pull speed, etc. In some embodiments, the computing module 1150 includes a communication interface(s) 1156 for receiving the commands, e.g., BLUETOOTH, other radio frequency interfaces, other wireless interfaces, wired interfaces, etc. In some embodiments, the processor 1152 executes instructions stored in the memory 1154 to determine which command it received and controls the motor interface 1158 based at least in part on the command. The motor interface 1158 can include one or more of relays, switches, PWM H-bridges, CAN open interfaces, etc. In some embodiments, the processor 1152 can be embodied as a microprocessor, a coprocessor, a controller or various other computing or processing devices including integrated circuits such as, for example, an ASIC, an FPGA, some combination thereof, or the like, etc.

As described herein, the gauge device 20, cable puller 22, rope auto spooler machine 33, cable tray feeder 31, cable feeder 32, and/or communication device 402 may be implemented in many different ways in many different combinations of hardware, software, firmware, or any combination thereof. The processors become specially configured for performing the operations by the instructions. The processor may mean any type of circuitry configurable to perform the functionality described herein, such as, but not limited to, a microprocessor, a controller, a graphics processor, a digital signal processor, and/or other processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The gauge device 20, cable puller 22, rope auto spooler machine 33, cable tray feeder 31, cable feeder 32, and/or communication device 402 can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A gauge device configured to measure tension on a pulling rope during a cable pull comprising:
   a frame having a lower edge and an upper edge and side edges extending between the lower and upper edges;
   a housing carried by the frame, the housing being configured to translate linearly relative to the frame;
   a roller rotatably carried by the housing;
   a sensor carried by the frame beneath the housing, wherein when the housing moves relative to the frame, the housing is configured to engage with the sensor to activate the sensor;
   at least one additional roller rotatably attached to the frame;
   a computing module mounted in an enclosure which extends a predetermined distance outwardly from the frame, the sensor being in communication with the computing module;
   a first handle attached to the frame adjacent to, but spaced from the lower edge, the first handle extending a predetermined distance outwardly from the frame;
   a second handle attached to the frame adjacent to, but spaced from the upper edge, the second handle extending a predetermined distance outwardly from the frame; and
   the enclosure positioned between the handles, wherein the distance each handle extends outwardly from the frame is greater than the distance the enclosure extends outwardly from the frame.

2. The gauge device of claim 1, wherein the sensor is a compression load cell.

3. The gauge device of claim 1, wherein the sensor includes a depressible button which, when depressed by contact with the housing, activates the sensor.

4. The gauge device of claim 1, further comprising a display on an exterior surface of the frame.

5. The gauge device of claim 1, wherein a plurality of additional rollers are rotatably carried by the frame, and at least one of the additional rollers is mounted by a mount from which the at least one of the additional rollers is configured to be detached therefrom and reattached thereto.

6. The gauge device of claim 5, wherein four additional rollers are rotatably carried on the frame.

7. The gauge device of claim 1, wherein the roller mounted in the housing defines a first roller, and four additional rollers are rotatably carried on the frame and define second, third, fourth and fifth rollers, wherein the first roller is mounted at a center of the frame, the second and third rollers are mounted above the first roller, and the fourth and fifth rollers are mounted adjacent to the first roller and below the second and third rollers.

8. The gauge device of claim 1, wherein the second and third rollers are each mounted by a mount from which the respective roller is configured to be detached therefrom and reattached thereto.

9. The gauge device of claim 1, wherein the frame is formed of one or more of aluminum, steel, plastic, rubber and carbon composite.

10. The gauge device of claim 1, wherein the frame is formed of a first frame part and a second frame part, each frame part having a plurality of cutouts therein.

11. The gauge device of claim 1, the frame is formed of a first frame part and a second frame part, each frame part is formed of an outer continuous portion and a plurality of arms that interconnect with each other and define a plurality of cutouts.

12. The gauge device of claim 11, wherein each frame part is generally symmetrical about a centerline the frame part.

13. A gauge device configured to measure tension on a pulling rope during a cable pull comprising:
   a frame including a first frame part and a second frame part, each frame part having an inner surface, an outer surface, a lower edge, an upper edge, a first side edge extending between the lower and upper edges, and a second side edge extending between the lower and upper edges, and wherein in each frame part the lower edge angles inwardly from the outer surface to the inner surface;
   a housing carried by the frame, the housing being configured to translate linearly relative to the frame;
   a roller rotatably carried by the housing;
   a sensor carried by the frame beneath the housing, wherein when the housing moves relative to the frame, the housing is configured to engage with the sensor to activate the sensor; and
   at least one additional roller rotatably attached to the frame.

14. The gauge device of claim 13, wherein the frame is further comprised of a mounting plate extending between the frame parts, the mounting plate is mounted proximate to a lower edge of each frame part, the mounting plate comprising lower and upper surfaces, end surfaces extending between the lower and upper surfaces, and side surfaces extending between the lower and upper surfaces, the side surfaces mated with inner surfaces of the frame parts, the lower surface having an elongated slot extending along a length of the mounting plate defined between the end surfaces, the slot being comprised of a first angled surface extending from the lower surface, a second angled surface extending from the lower surface, a third vertical surface extends from a top end of the first angled surface, a fourth vertical surface extending from a top end of the second angled surface, and a fifth horizontal surface extending from upper ends of the third and fourth surfaces.

15. The gauge device of claim 13, wherein in each frame part, the lower edge is shorter in length than the upper edge.

16. A gauge device configured to measure tension on a pulling rope during a cable pull comprising:
a frame including first and second frame parts and a mounting plate mounted proximate to a lower edge of each frame part, the mounting plate comprising lower and upper surfaces, end surfaces extending between the lower and upper surfaces, and side surfaces extending between the lower and upper surfaces, the side surfaces mated with inner surfaces of the frame parts, the lower surface having an elongated slot extending along a length of the mounting plate defined between the end surfaces, the slot being comprised of a first angled surface extending from the lower surface, a second angled surface extending from the lower surface, a third vertical surface extends from a top end of the first angled surface, a fourth vertical surface extending from a top end of the second angled surface, and a fifth horizontal surface extending from upper ends of the third and fourth surfaces;
a housing carried by the frame, the housing being configured to translate linearly relative to the frame;
a roller rotatably carried by the housing;
a sensor carried by the frame beneath the housing, wherein when the housing moves relative to the frame, the housing is configured to engage with the sensor to activate the sensor; and
at least one additional roller rotatably attached to the frame.

17. The gauge device of claim 1, further comprising a second sensor on an exterior of the frame, the second sensor configured to calculate a speed of the pulling rope, and one or more magnetic targets on the housing.

18. The gauge device of claim 17, wherein the second sensor is a Hall effect sensor.

19. A gauge device configured to measure tension on a pulling rope during a cable pull comprising:
a frame;
a housing carried by the frame, the housing being configured to translate linearly relative to the frame;
a roller rotatably carried by the housing;
a sensor carried by the frame beneath the housing, wherein when the housing moves relative to the frame, the housing is configured to engage with the sensor to activate the sensor;
at least one additional roller rotatably attached to the frame; and
a locking bar pivotally attached to the frame, and a locking pin attached to the locking bar, wherein the locking bar is configured to pivot from a first position wherein an end of the locking bar overlaps the frame and the locking pin is configured to be inserted into the frame, and a second position wherein the end of the locking bar extends outwardly from the frame and the locking pin is configured to be inserted into the frame.

20. The gauge device of claim 1, wherein the housing is carried by the frame by a rail which seats within a slot, the rail being configured to slide along the slot.

21. The gauge device of claim 1, further comprising a display on the enclosure in operative communication with the computing module, wherein the display is visible between the handles.

22. The gauge device of claim 13, wherein the frame is formed of one or more of aluminum, steel, plastic, rubber and carbon composite.

23. The gauge device of claim 22, wherein the handles are formed of aluminum.

24. The gauge device of claim 13, wherein the first frame part has a plurality of cutouts therein, and the second frame part has a plurality of cutouts therein.

* * * * *